March 7, 1944.    R. B. JOHNSON    2,343,414
PUNCHING MACHINE
Filed Feb. 24, 1943    16 Sheets-Sheet 2
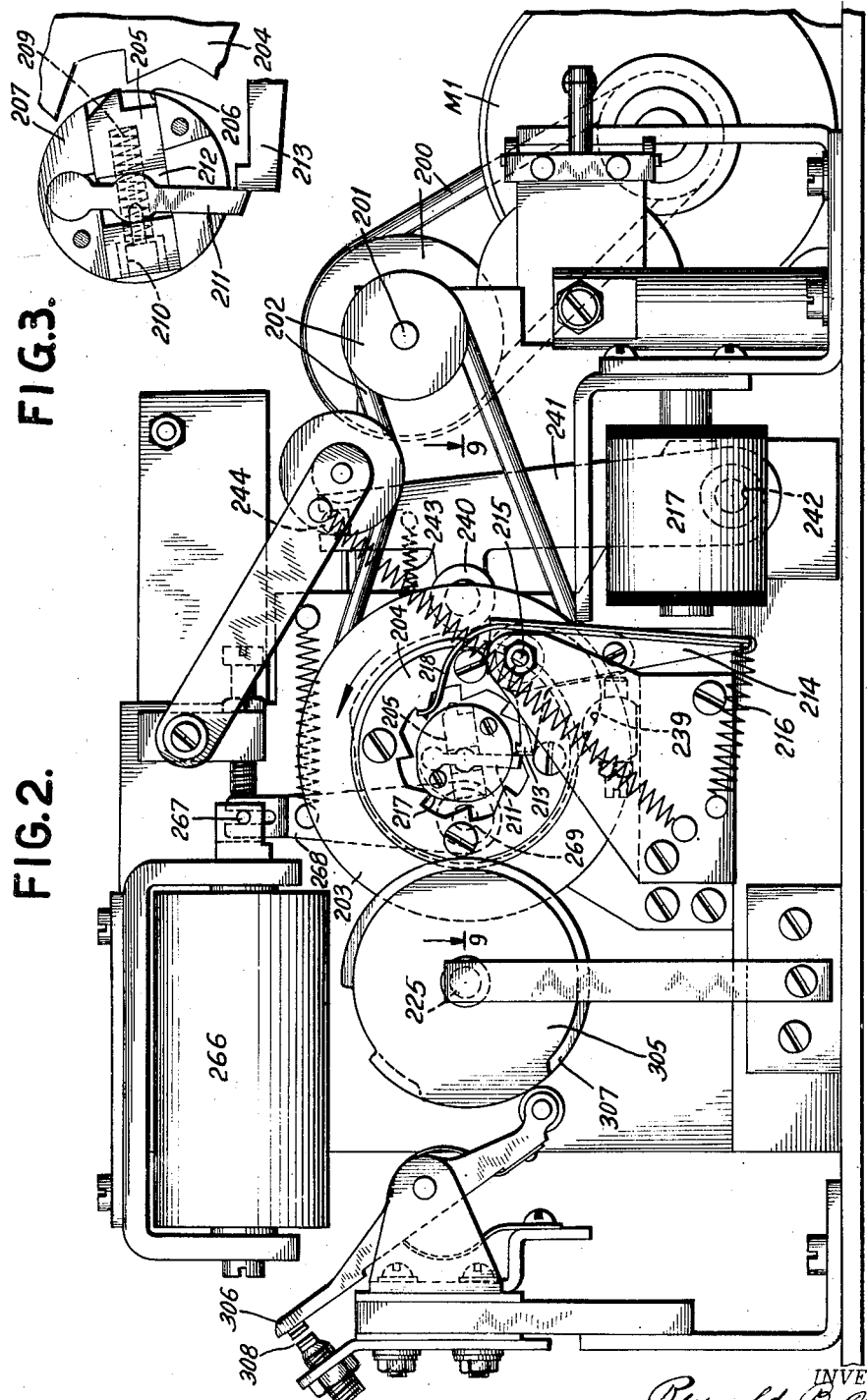
INVENTOR
Reynold B. Johnson
BY
ATTORNEY

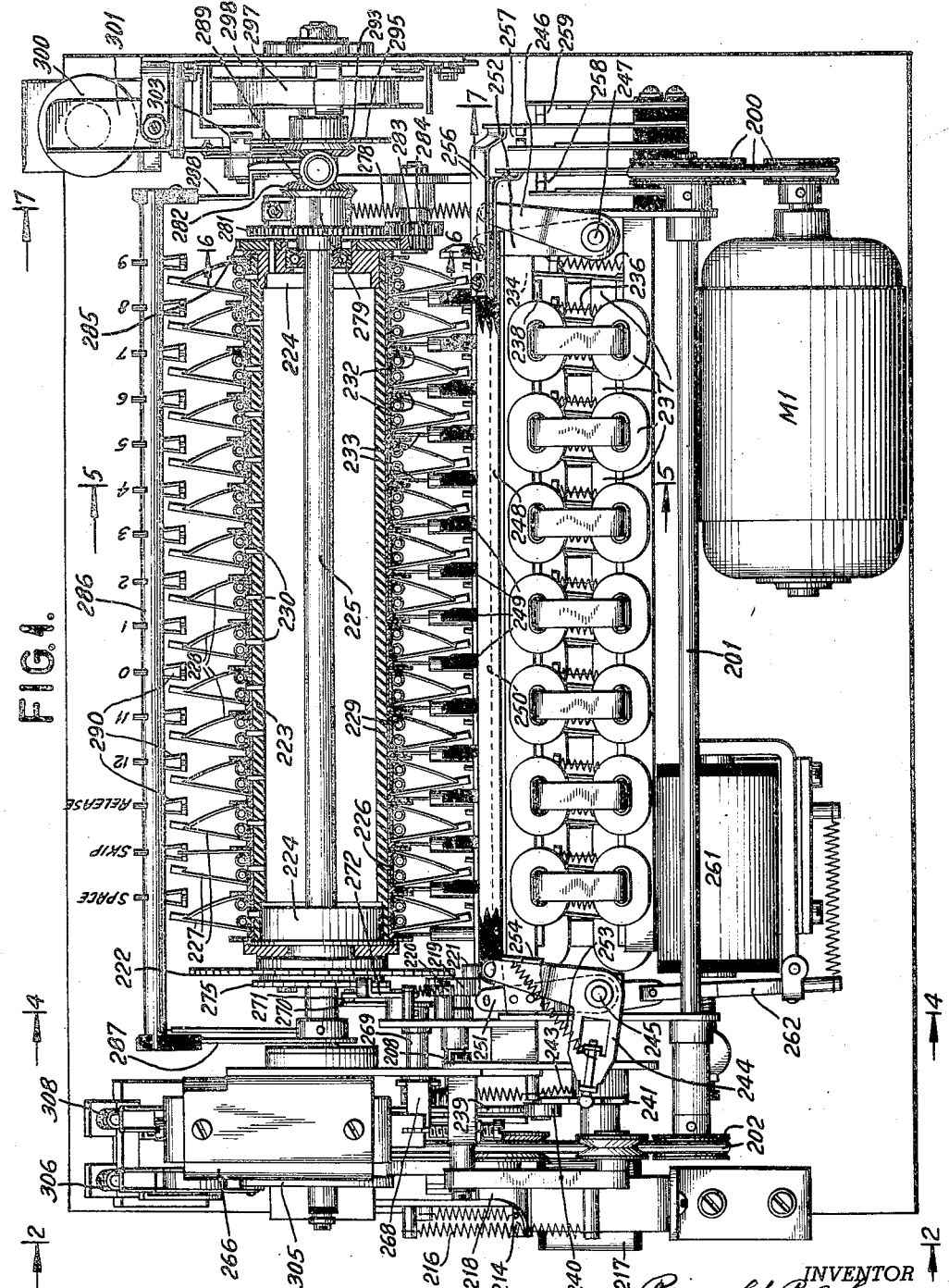

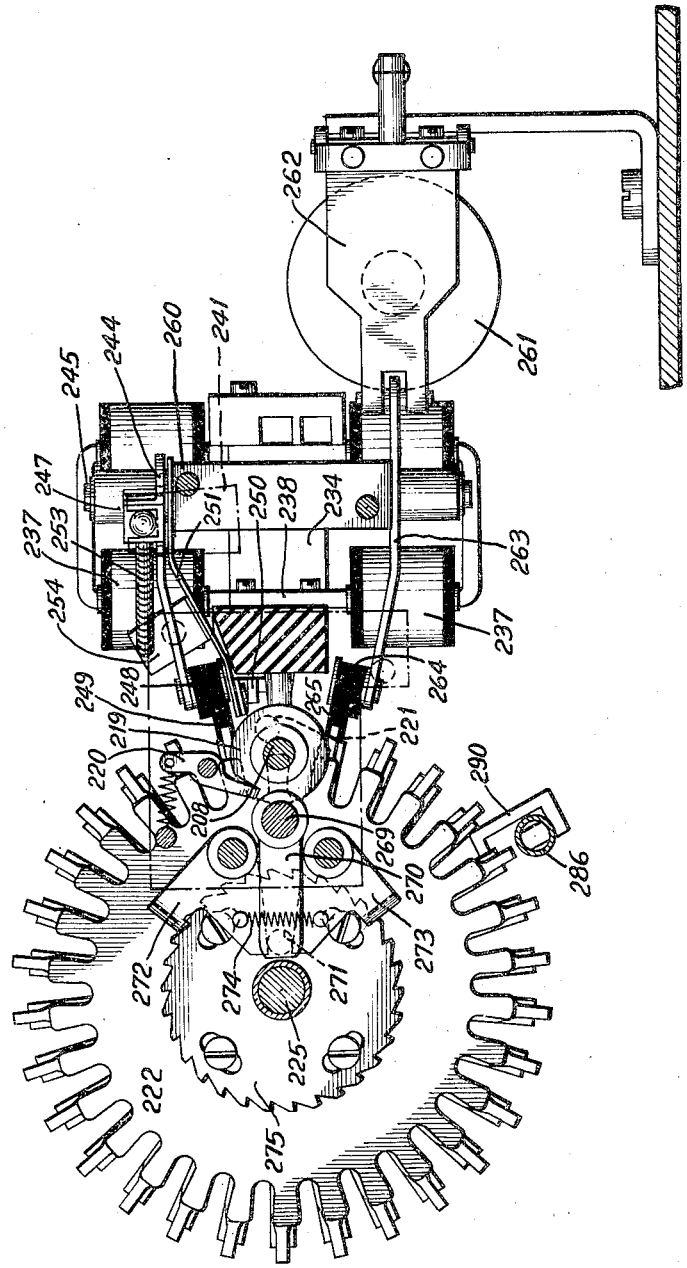

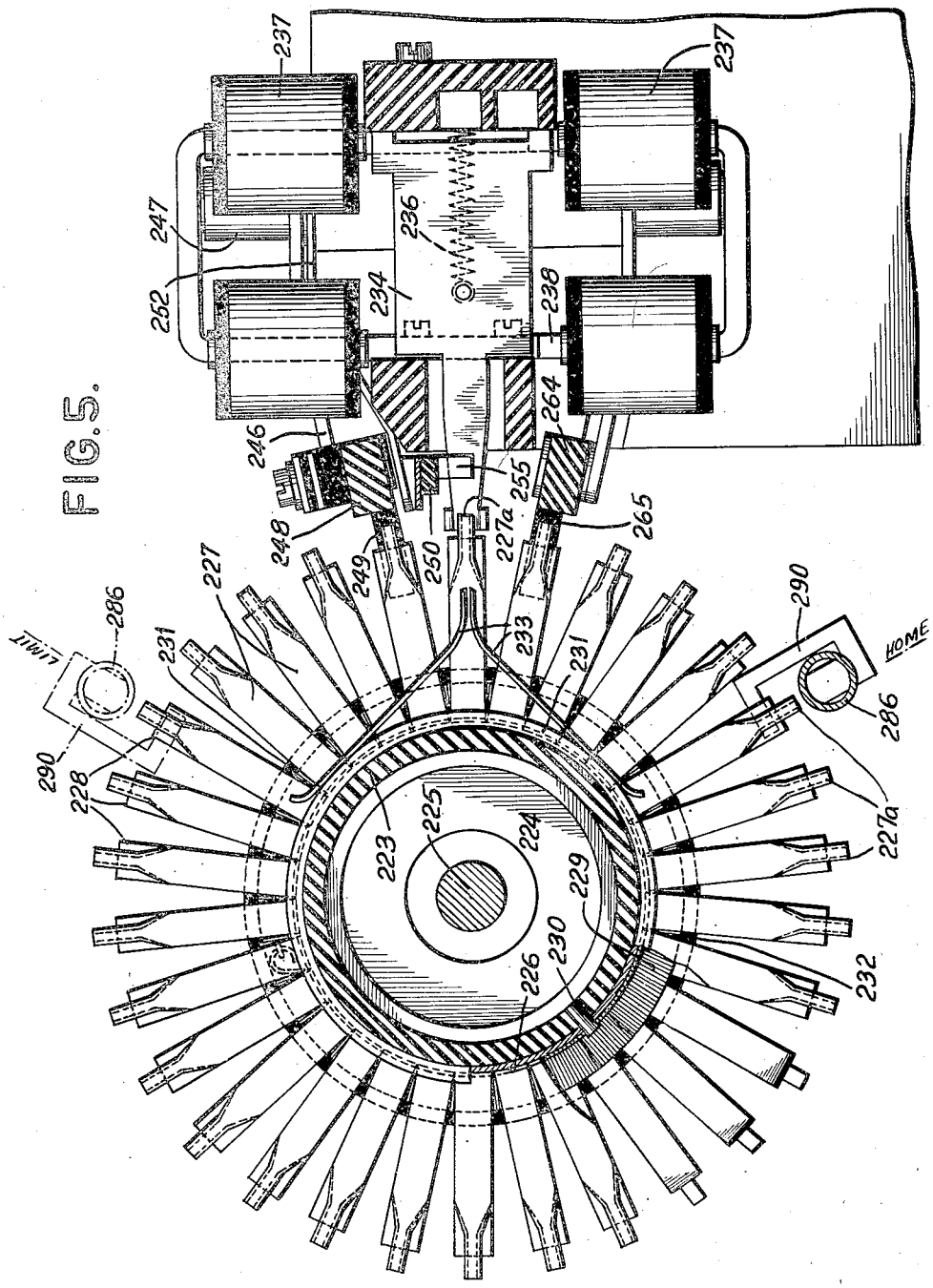

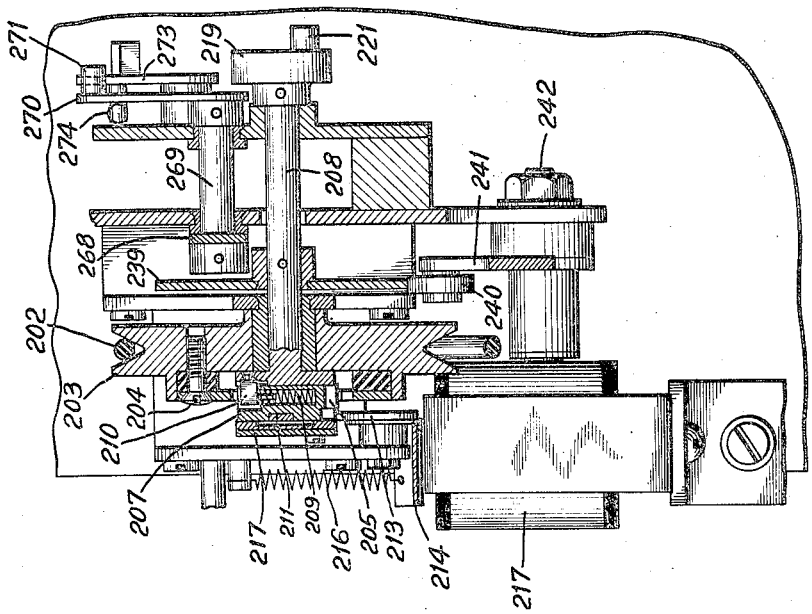

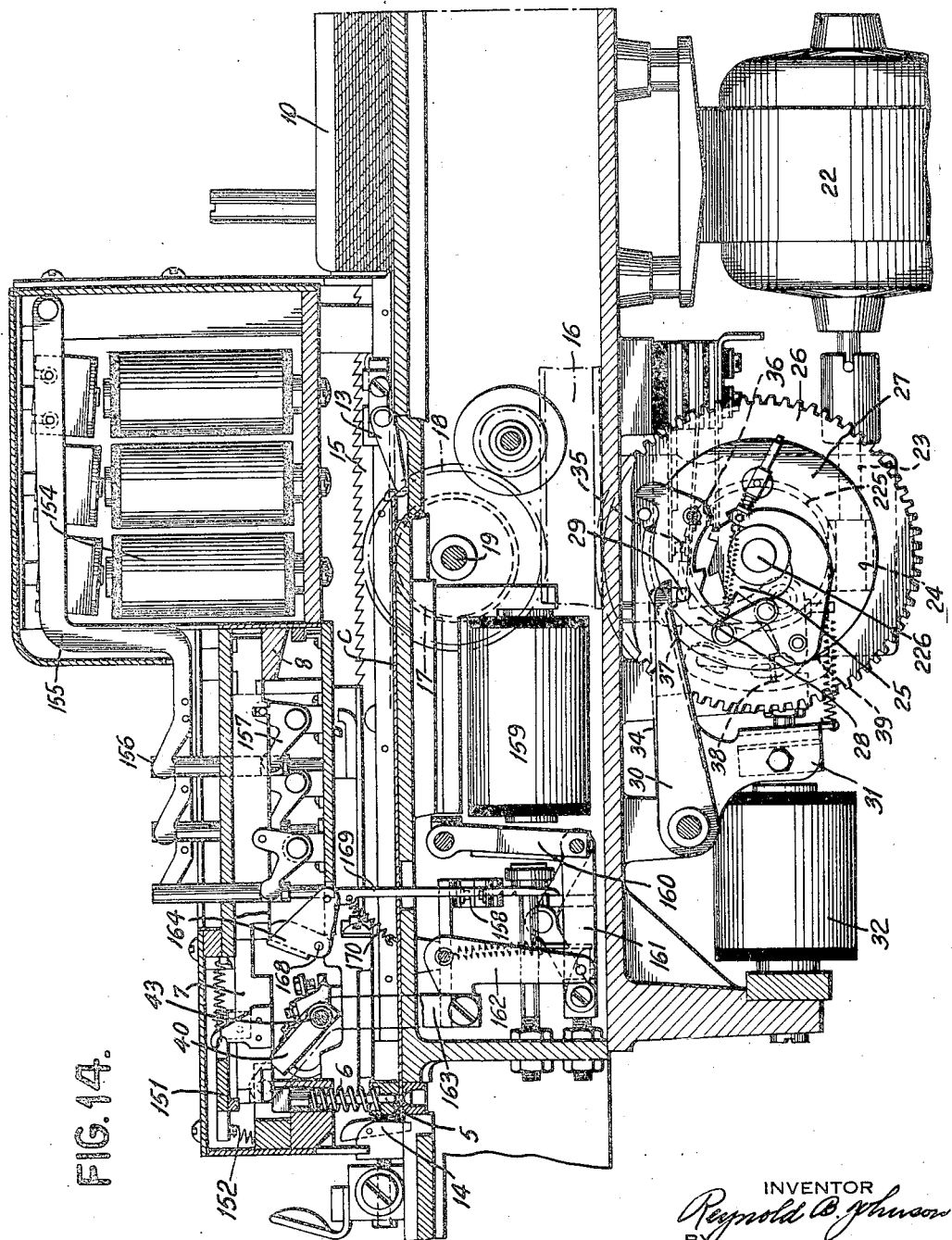

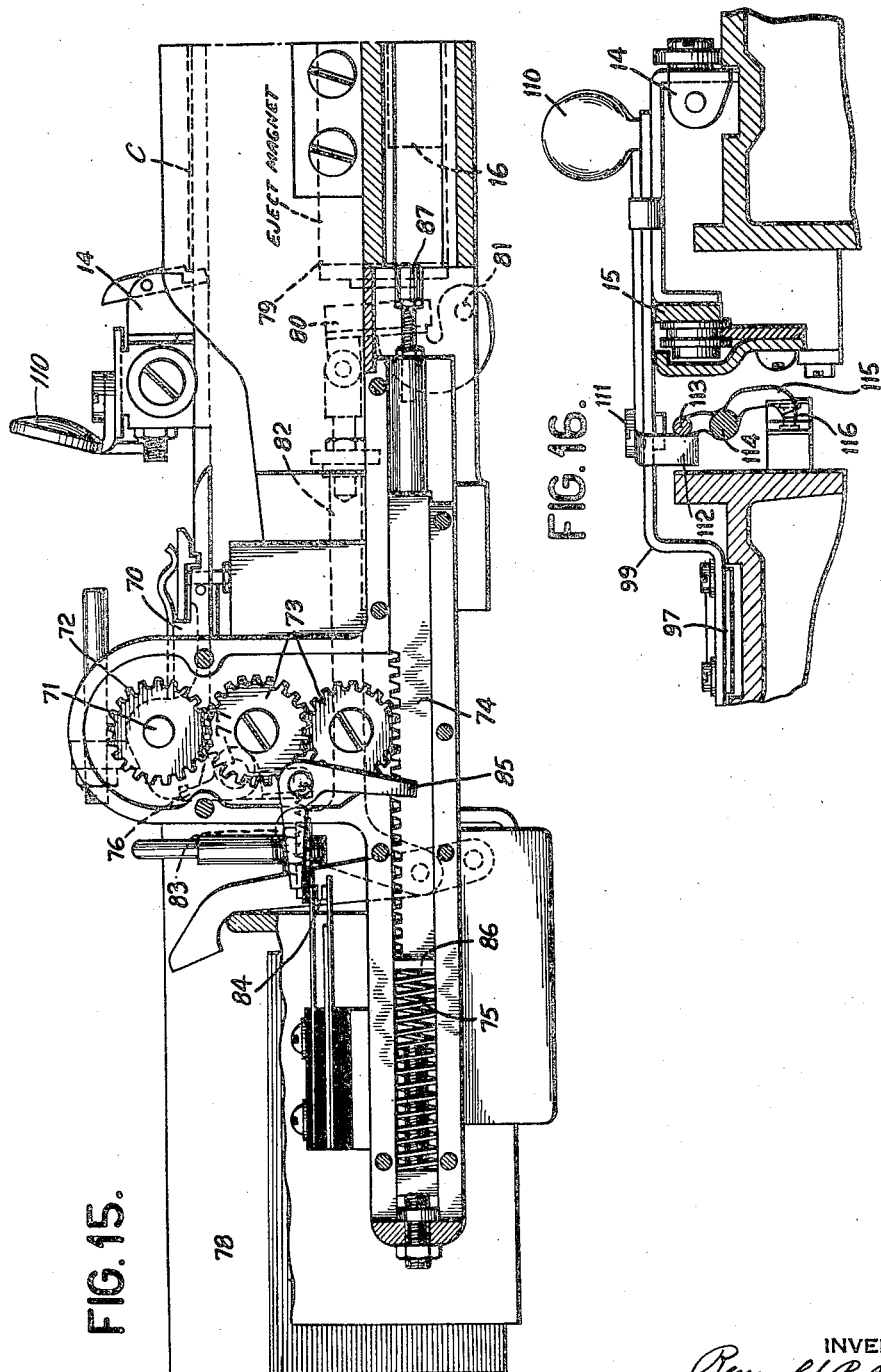

March 7, 1944.   R. B. JOHNSON   2,343,414
PUNCHING MACHINE
Filed Feb. 24, 1943   16 Sheets-Sheet 10

INVENTOR
Reynold B. Johnson
BY
ATTORNEY

March 7, 1944.    R. B. JOHNSON    2,343,414
PUNCHING MACHINE
Filed Feb. 24, 1943    16 Sheets-Sheet 12
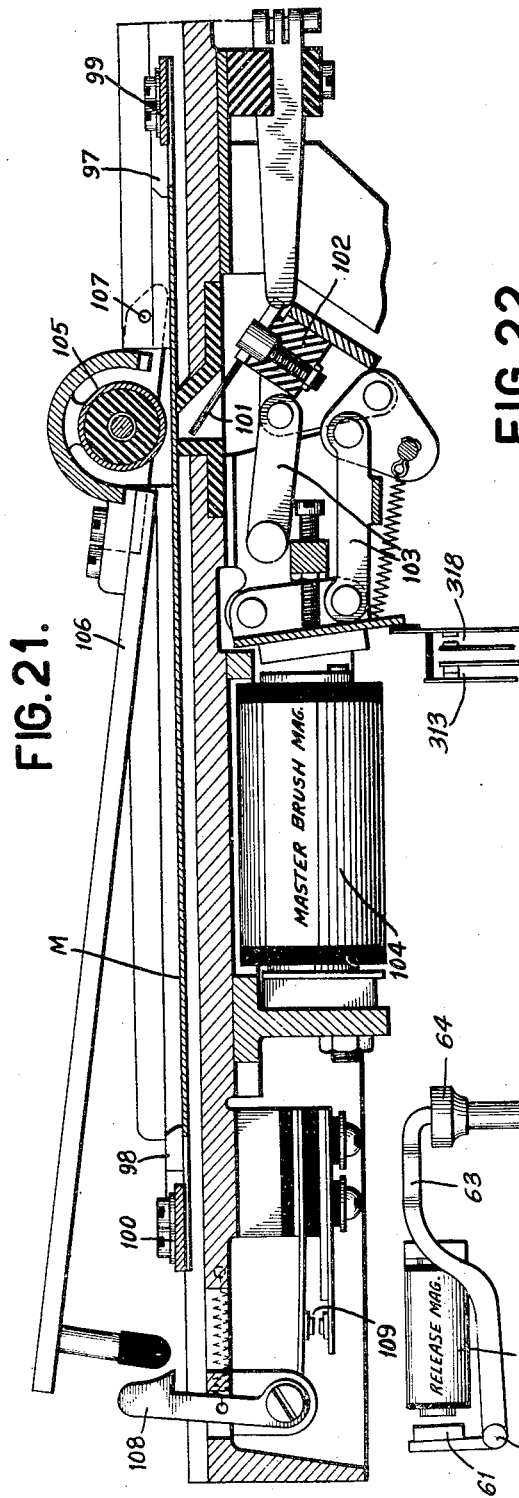
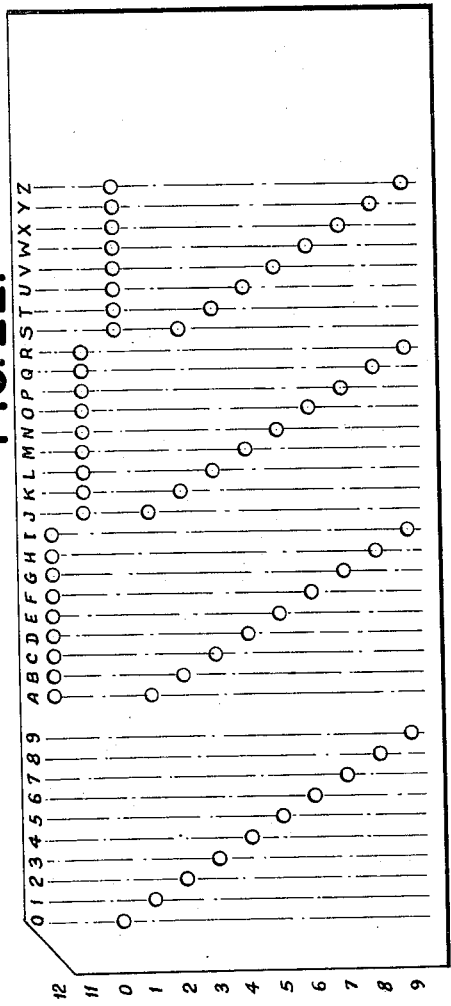
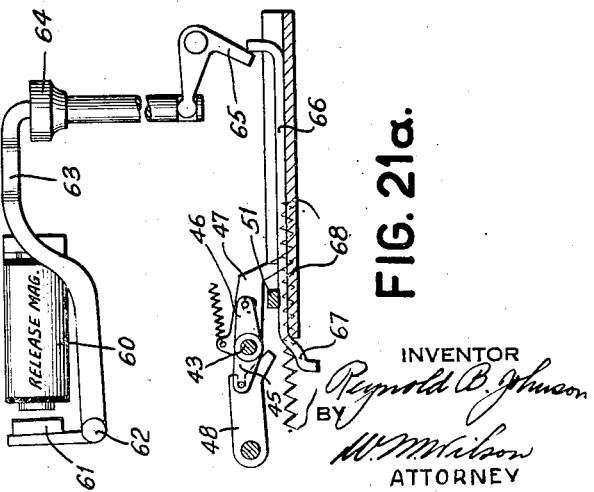
INVENTOR
Reynold B. Johnson
BY
W. P. Wilson
ATTORNEY

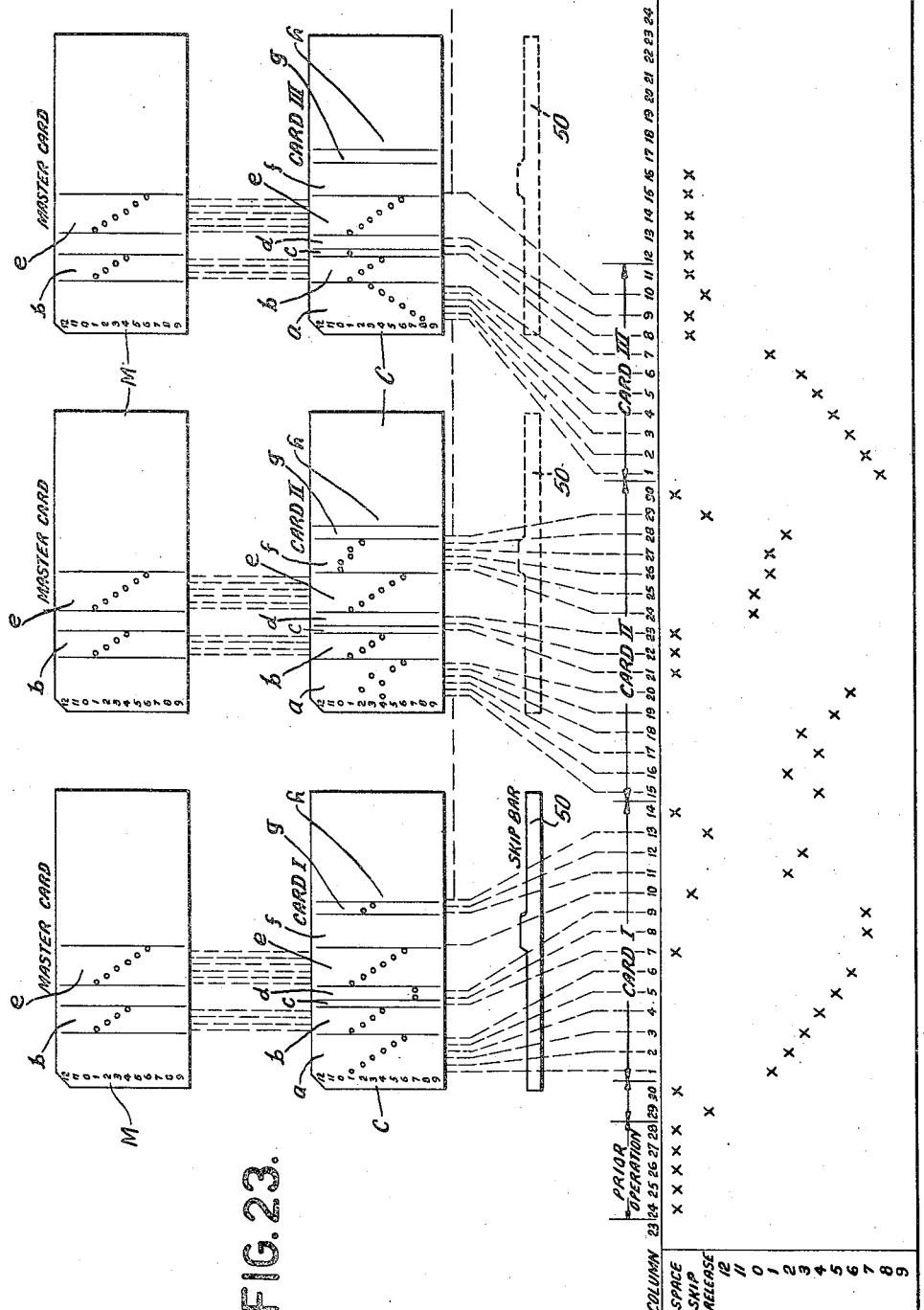

March 7, 1944.   R. B. JOHNSON   2,343,414
PUNCHING MACHINE
Filed Feb. 24, 1943   16 Sheets-Sheet 14

March 7, 1944.  R. B. JOHNSON  2,343,414
PUNCHING MACHINE
Filed Feb. 24, 1943   16 Sheets-Sheet 15
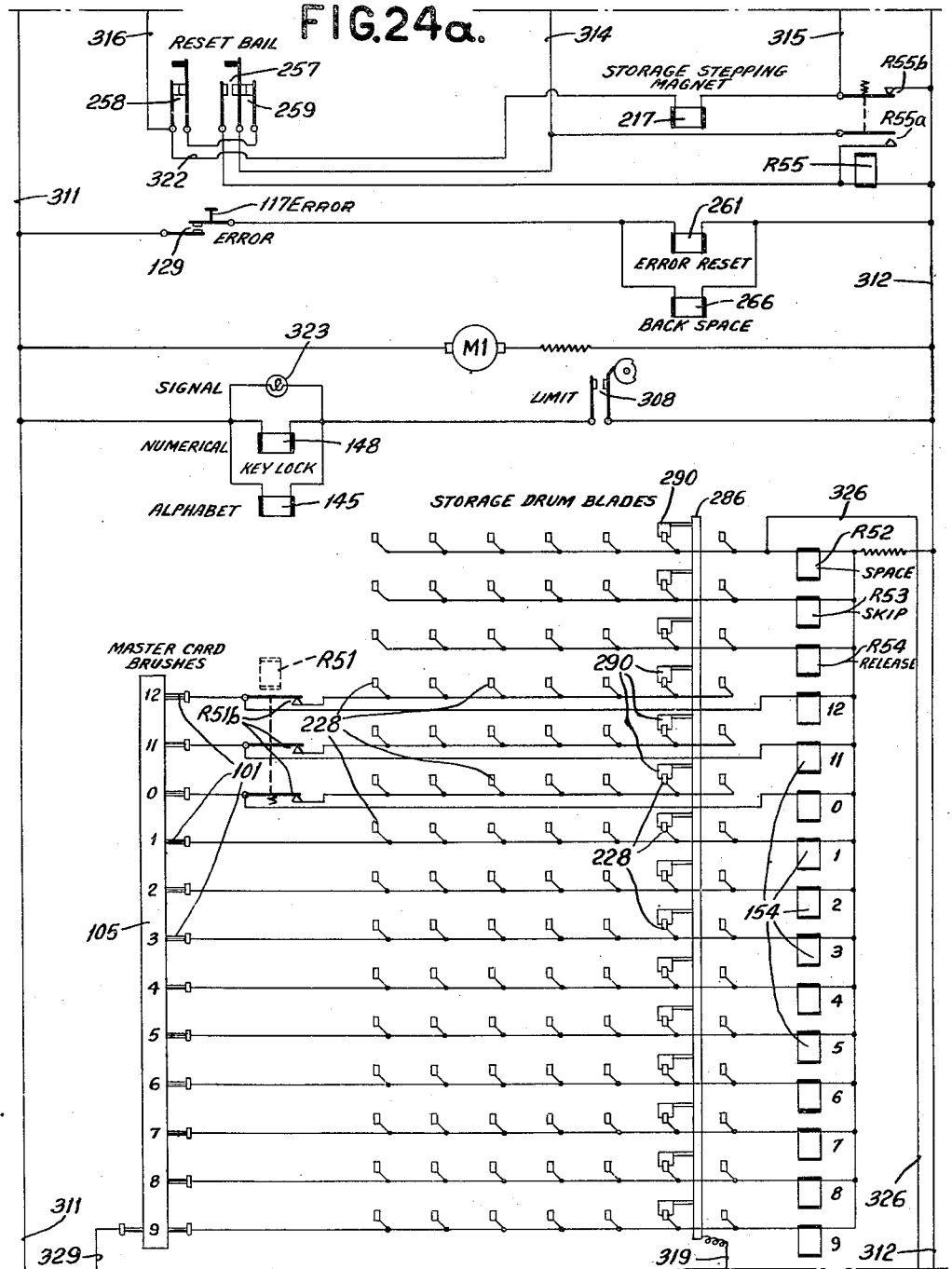

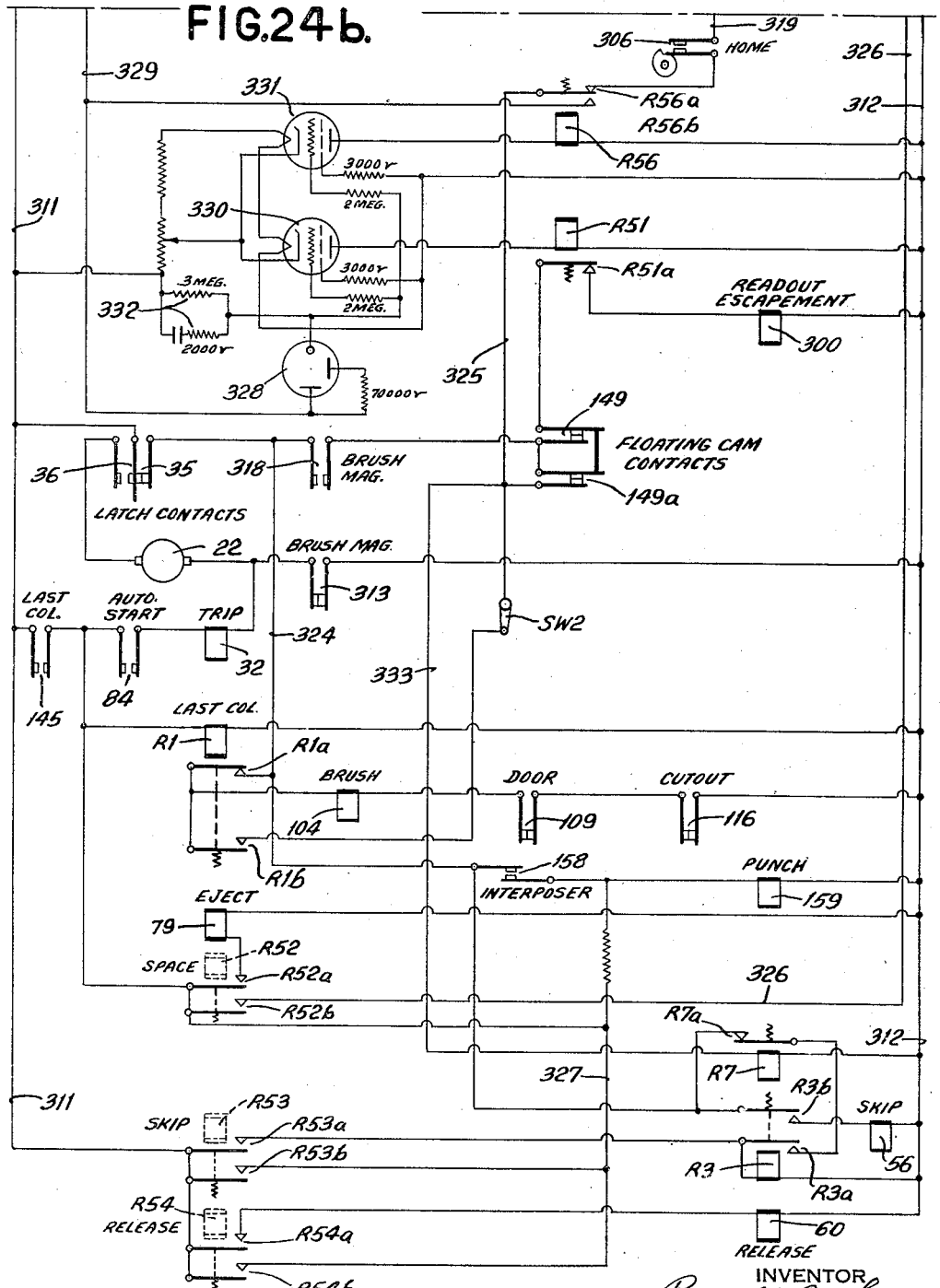

Patented Mar. 7, 1944

2,343,414

UNITED STATES PATENT OFFICE 2,343,414

PUNCHING MACHINE

Reynold B. Johnson, Binghamton, N. Y., assignor to International Business Machines Corporation, New York, N. Y., a corporation of New York Application February 24, 1943, Serial No. 476,895

17 Claims. (Cl. 164—113)

This invention concerns machines for perforating statistical record cards of the well known Hollerith type.

It has for its general object the provision of certain means whereby the overall operating time required to perforate a record card may be materially lessened. Punching machines of the type to which the present invention applies are generally characterized as step-by-step or successive column punching machines, in which for each operation of a key representing a numeral or a character or other symbol, perforations are made in a column of the card, and the card then automatically advances to present the next successive column. Such machines are generally provided with a so-called master or pattern card sensing section, in which a prepunched pattern card is placed and advanced past a row of sensing brushes as the record card advances past a row of punches. When the columns of the master card in which perforations have been made arrive at the sensing brushes, they control the operation of the punches to automatically duplicate the prepunched data in the record card. While this is being done, the operator must necessarily await its completion before further key controlled entries or punching may be effected.

Such machines are also provided with automatic skipping mechanism which functions to uninterruptedly advance the record card from any predetermined column or position to any later position. During such skipping operation, the operator must again await its completion before punch controlling keys can be actuated. Such machines are also provided with automatic mechanism effective upon completion of the punching of a card for ejecting the same into a discharge hopper and for feeding a new record card from a supply magazine into punching position. During such operations, obviously the operator is also required to refrain from operation of the punch controlling keys.

It is the principal object of the present invention to provide an arrangement whereby the time required for the performance of these duplicating, skipping, card ejecting and feeding operations does not act to delay the operator's manipulation of data entry controlling keys.

In carrying out the objects of the invention, a so-called storage mechanism is provided which is directly controlled by the keys to receive the information punched and also to receive settings representative of skipping, spacing and card releasing functions to be performed. This storage mechanism in turn controls the operation of the punching machine to effect the punching and other operations in the order in which they were previously set up in the storage mechanism by the operator. The reading in operation during which the operator effects settings in the storage mechanism is independent of the so-called reading-out operation, during which the storage mechanism controls the punch so that, while the operator is entering certain data, the storage mechanism is controlling the punching in accordance with some previously entered data.

A specific object of the invention is to provide a key controlled storage mechanism coordinated with a punching machine, whereby key controlled data entries may be made in the storage mechanism while the punching machine is being controlled by a pattern card or the record card is being skipped or ejected.

A more specific object of the invention is to provide an improved form of storage mechanism of novel and simple construction.

A further object of the invention is to provide improved switching mechanism for shifting the control of the punch from a storage mechanism to the pattern card, said switching mechanism being controlled automatically and solely upon the sensing of perforations in the pattern card.

A still further object of the invention is to provide novel back spacing mechanism for the storage device, whereby a setting once made may be erased and replaced by another setting.

A still further object of the invention provides for interlocking control devices between the storage mechanism and the punch, whereby further entries in the storage mechanism will be prevented when its data receiving capacity has been reached.

A still further object of the invention is to provide storage mechanism in which a predetermined sequence of operations for the punching machine may be set up and later utilized to control the operation of the machine in accordance with said prior setting.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the storage mechanism.

Fig. 2 is a side view of the storage mechanism looking in the direction of the arrows 2—2 of Fig. 1.

Fig. 3 is a detail of a one revolution clutch mechanism shown on a smaller scale in Fig. 2.

Fig. 4 is a section taken along the lines 4—4 of Fig. 1, showing the back space operating mechanism.

Fig. 5 is a sectional view taken along the lines 5—5 of Fig. 1, the section being taken through the storage drum to show a circle of setting contact blades and the operating magnets therefor.

Fig. 9 is a detail section taken along lines 9—9 of Fig. 2, showing the one revolution clutch mechanism and associated devices.

Fig. 10 is a detail showing a setting magnet and the manner in which it cooperates with the storage blades to effect a setting thereof.

Fig. 11 is an enlarged detail of a pair of contact blades, showing them in set and unset or latched position, together with the relationship they gear to the readout device.

Fig. 12 is a detail of the readout blades, the section being taken along lines 12—12 of Fig. 11.

Fig. 14 is a central section through the punching mechanism taken along the lines 14—14 of Fig. 13.

Figure 13:
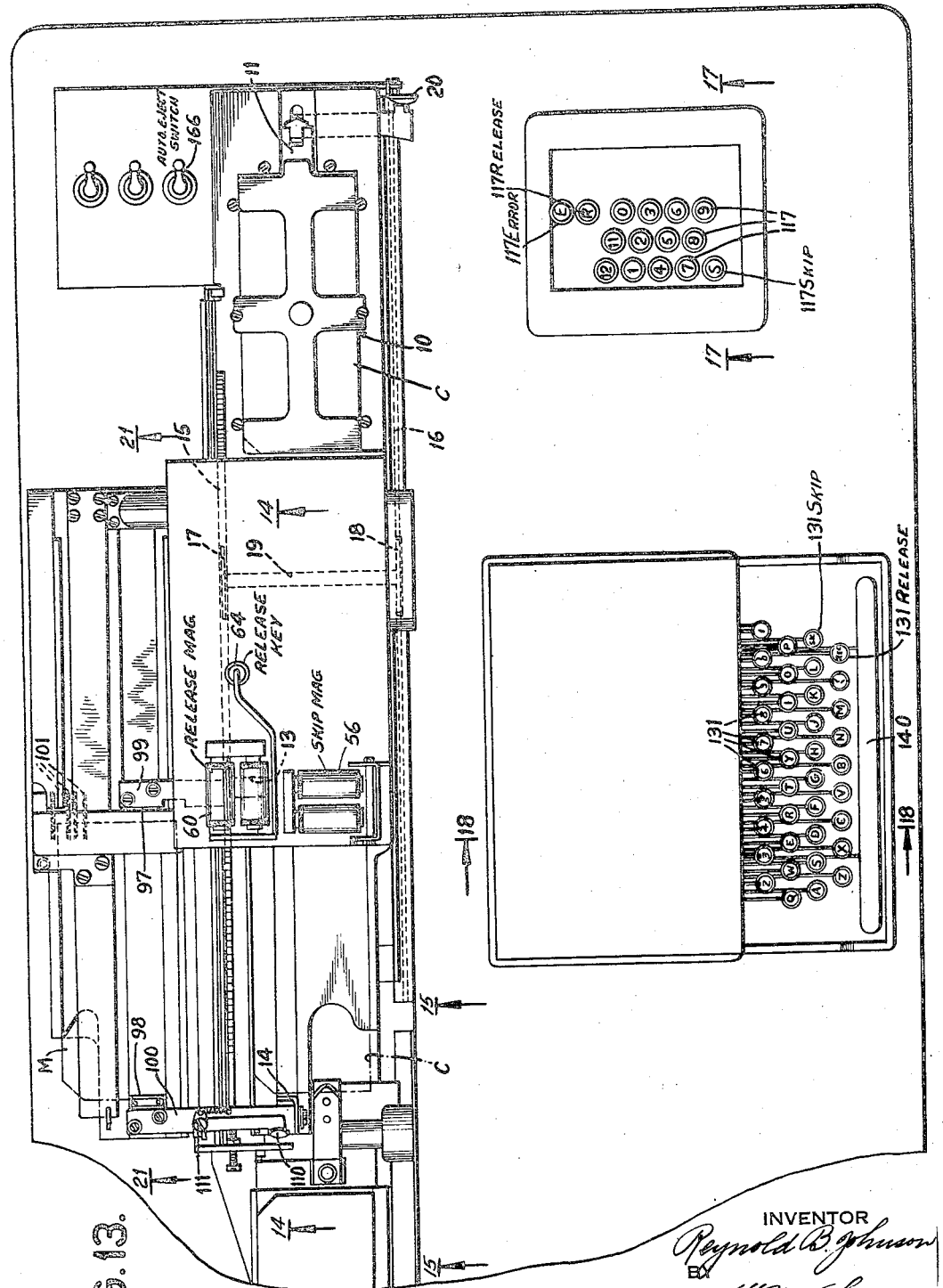
Fig. 13 is a plan view of the punching mechanism and the keyboard mechanism.

Fig. 15 taken substantially along lines 15—15 of Fig. 13 is an outside view of the left end of the punching mechanism showing the arrangement of the card ejecting devices.

Fig. 16 is a detail section showing the location and manner of operation of the so-called cutout contacts.

Figure 17:
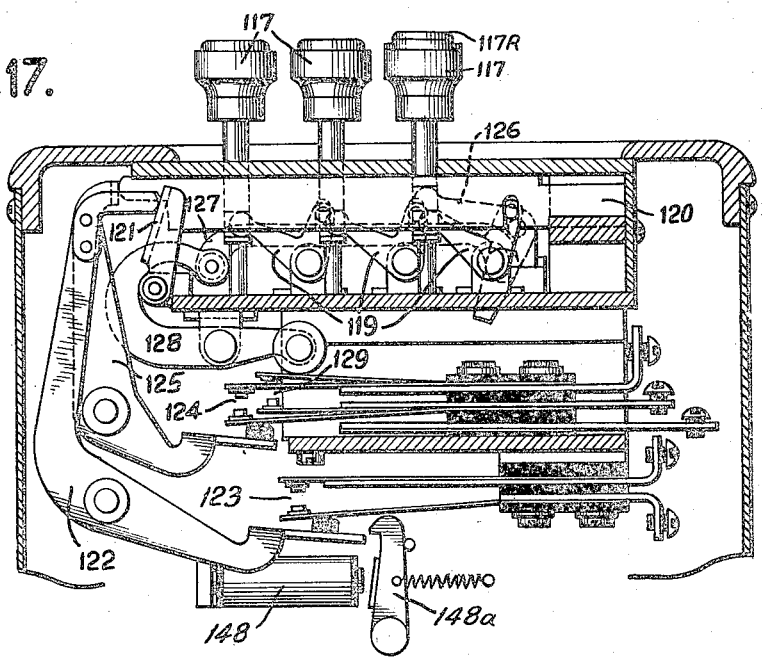

Fig. 17 is a sectional view of the numerical keyboard unit taken along the lines 17—17 in Fig. 13.

Figure 18:
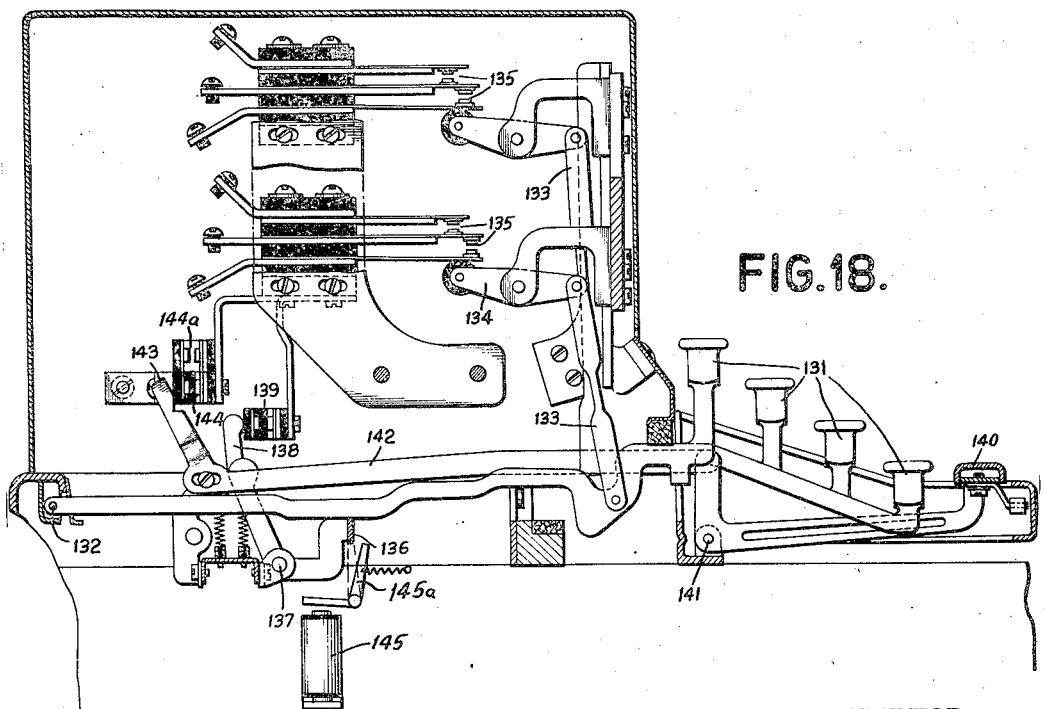

Fig. 18 is a sectional view through the alphabetic-numerical keyboard unit, the view being taken substantially along the lines 18—18 of Fig. 13.

Figure 19:
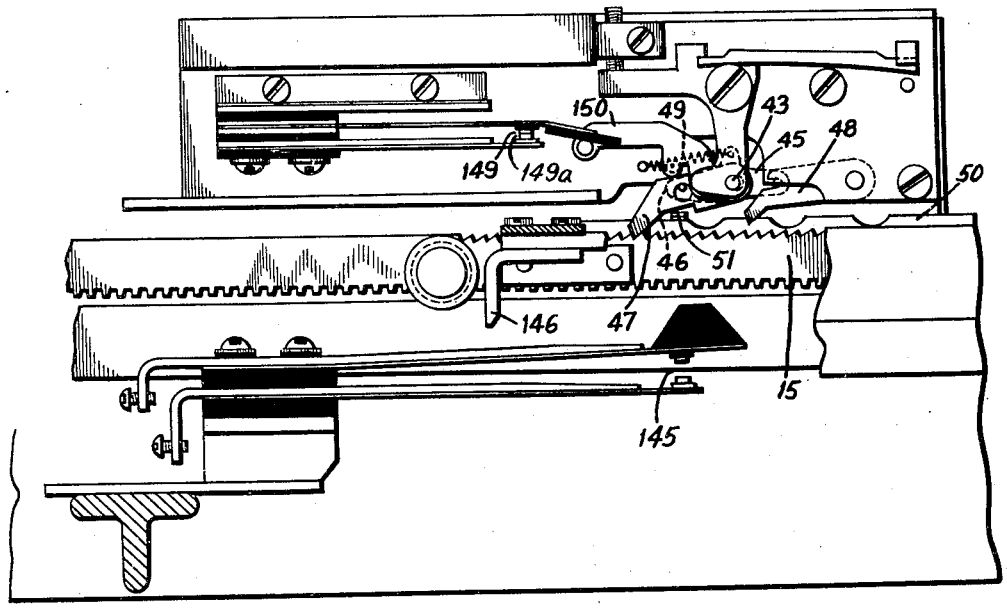

Fig. 19 is a detail view of the card carriage escapement mechanism.

Figure 20:
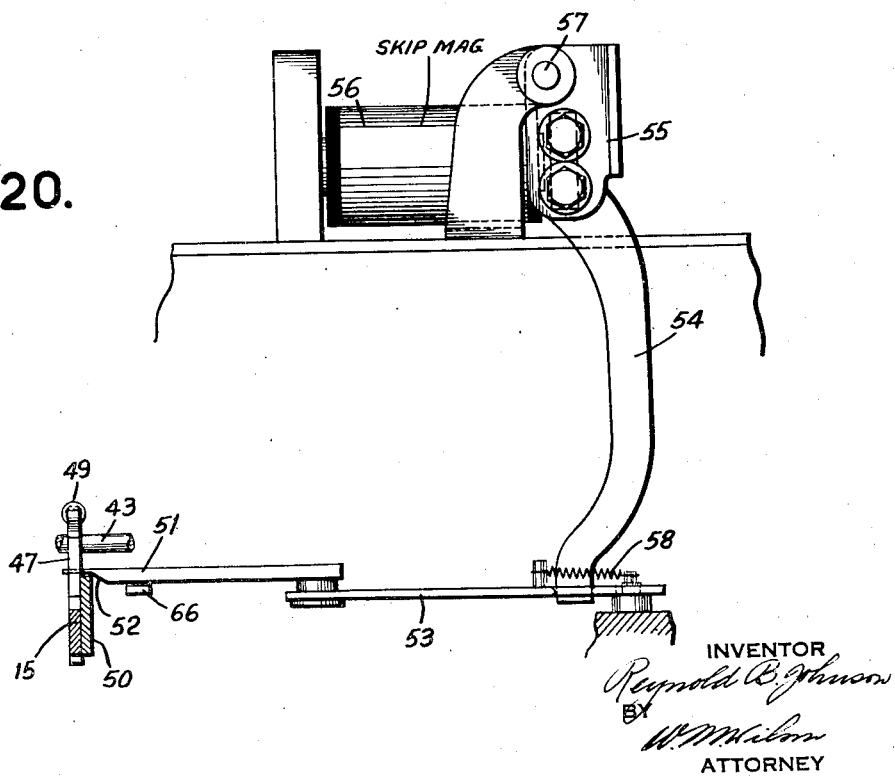

Fig. 20 is a detail of the skip magnet and the mechanism controlled thereby.

Fig. 21 is a section taken through the master card reading section of the machine along the lines 21—21 of Fig. 13.

Fig. 21a is a detail of the mechanism controlled by the release magnet.

Fig. 22 is a record card showing the coding arrangement for the various characters.

Fig. 23 is a diagrammatic showing of several record cards to be punched and the storage mechanism which controls the punching operations.

Figure 24:
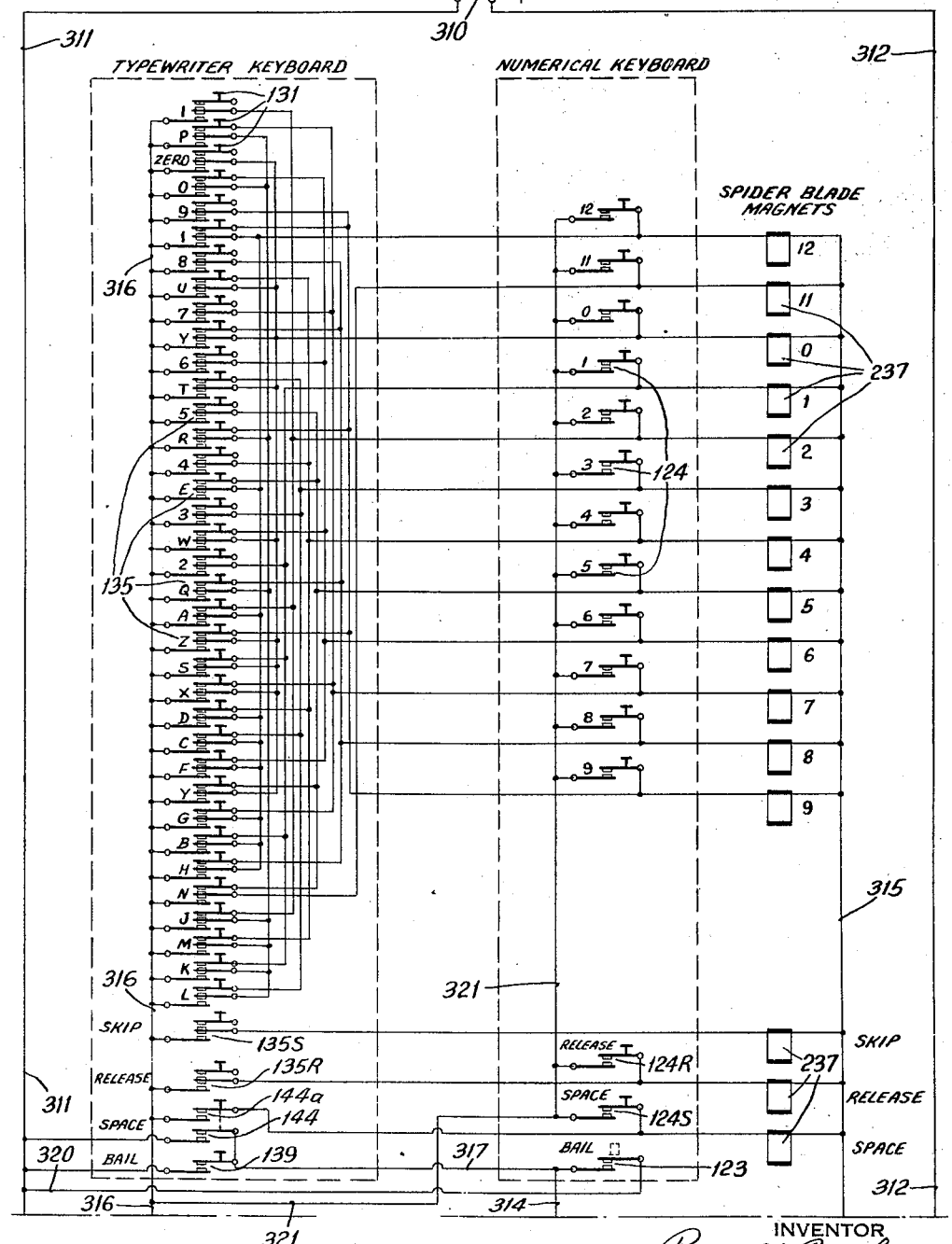

Figs. 24, 24a and 24b placed sequentially downwardly in the order named constitute a wiring diagram of the electric circuits of the machine.

The apparatus comprises four mechanically separate units, a card feeding and sensing unit shown in the upper part of Fig. 13, an alphabetic-numeric keyboard arrangement shown in the central part of the figure, a numerical keyboard shown at the right of Fig. 13, and a storage unit located beneath the base of the machine.

The mechanical arrangement of the card feeding mechanism is substantially the same as that found in the machine known as the "International duplicating key punch," such as shown in Patent 1,914,263, granted June 13, 1933, to C. D. Lake et al.; Patent 2,107,161 granted Feb. 1, 1938, to R. E. Page; and Patent 1,976,618 granted October 9, 1934, to F. Lee et al. Patent 2,107,161 also shows a numerical keyboard structure similar to that used in the present arrangement. Since most of the mechanical arrangement of the card punching mechanism is already well known, the same will be but briefly explained in the following and in only so much detail as is necessary for an understanding of the present invention, and reference may be had to the patents cited for a further detailed explanation.

*Card feeding mechanism*

Referring to Fig. 13, record cards C to be punched are placed in a magazine designated 10 from which they are advanced singly by means of a picker 11 toward the left to present their first column to a row of card punches designated 5 in Fig. 14. In this position the card carriage comprising a pusher 13 and a forward guide 14 engages the card and advances it step by step under control of the escapement mechanism to be described later. Pusher 13 and guide 14 are carried by an escapement rack 15 (see Fig. 13) and the picker knife 11 is carried by a rack bar 16. Rack 15 has a gear 17 meshing with its lower edge (see Fig. 14) and bar 16 has a gear 18 meshing with its upper edge, both gears being mounted on a cross-shaft 19 (see Fig. 13). Due to this connection between the elements, the movement of picker 11 toward the left as viewed in Fig. 13 is accompanied by movement to the right of pusher 13 and forward guide 14. At the commencement of operations, the picker and pusher are in the position shown in Fig. 13.

The rack 16 is provided with a finger piece 20 at its right hand extremity by means of which the rack 16 and the picker 11 may be moved toward the left to feed a card from the magazine 10. This movement is accompanied by movement of the pusher 13 in the opposite direction, the parts being so proportioned that, when the card has been advanced to present its first column to the row of punches 5, the pusher 13 will have moved toward the right sufficiently to engage the right hand or trailing edge of the card and will now control the further advancement thereof in response to the operation of the escapement mechanism. The usual one-way clutch mechanism (shown in Fig. 2 of Patent 1,976,618) permits the immediate return to the right of bar 16 and picker 11 under control of the usual spring.

The operation of card feeding just outlined is more fully explained in Patent 1,772,186 granted to F. L. Lee et al. for a duplicating punching machine. The escapement mechanism referred to is of the same general nature as that disclosed in the Schaaf Patent 1,426,223 and a brief description thereof will be given later.

Secured to the under side of the base of the machine is a motor 22 (Fig. 14) coupled to a stub shaft 23 to which is secured a worm 24 in mesh with a worm wheel 225 secured to a shaft 226, one end of which has secured thereto a ratchet-shaped clutch element 25. Loosely mounted on shaft 226 is a gear 26 meshing with teeth on the lower edge of rack bar 16 and on which gear is mounted a disk 27. Mounted upon disk 27 is a clutch mechanism generally designated 28, one element of which is provided with a pin 29 positioned for engagement by a finger 30 integral with the armature 31 of a magnet 32. With the machine at rest, the parts occupy the position shown in Fig. 14 and, when magnet 32 is energized, the finger 30 will operate the clutching mechanism to couple the disk 27 to the rotating ratchet 25, so that the disk 27 and gear 26 are rotated counterclockwise to drive the rack bar 16 toward the left. The clutching mechanism is constructed, as explained in greater detail in the patents referred to, so as to remain in engagement for substantially a complete revolution, at the completion of which time the clutching mechanism is uncoupled, whereby the parts may automatically return to the position shown under the influence of a spring (not shown).

This power drive of rack bar 16 toward the left has the same effect as the manual movement thereof previously explained, that is, a card will be advanced to punching position and the pusher 13 will engage the same for further step-by-step advancement, and rack bar 16 may thereafter return to its home position without disturbing the advanced position of the card C or pusher 13, this being permitted by the one-way clutch structure mentioned above.

Also integral with the armature 31 of the trip magnet 32 is an arm 34 (see Fig. 14), the free end of which is adapted to bear upon the center blade of pairs of contacts 35 and 36 to open the former and close the latter when magnet 32 is energized, and they will be maintained in such shifted position by a latching bell crank 37, the lateral extension 38 of which is adapted to be engaged by a plate 39 secured to gear 26, at the termination of the driving movement of the latter. The contacts 35 and 36 are used to control the energization of the driving motor 22 and their function will be more fully explained in connection with the circuit diagram.

The punches 5 are operated under control of the storage unit and also by means of a duplicator in accordance with the perforations of a pattern member which may be a previously punched card functioning as a master card M (Fig. 13). The punches 5 (Fig. 14) are of the general form disclosed in the patent of Lee and Phillips 1,772,186 and are normally held in raised position by springs 6 interposed between the enlarged heads thereof and the stripper member which is provided with openings to receive the lower ends of said springs. Resting on the upper ends of said punches are interposers 7 supported at their rear ends on a cross-member 8. The interposers 6 are so notched at their forward ends that, when they are in normal position, depression of an actuating plate 151 against a spring 152 will move a portion of the depressor plate 151 into such notches.

However, when any magnet 154 is energized, it will rock a related arm 155 to depress a plunger 156 and actuate a bell crank 157 against the action of suitably connected springs. The forward arm of each bell crank has a rounded head fitting into a notch in the shank of the plunger, the upright end having a pin in a slot in the lower edge of the corresponding interposer 7. Such interposer will then be advanced to a position where depression of the member 151 will effect depression of the interposer and consequently of the corresponding punch.

Upon movement of any of the interposers 7, a pair of contacts 158 is adapted to be closed thereby, closing the circuit to a punch magnet 159 which through intermediate mechanism is adapted to rock the plate 151 to actuate the selected punch 5. Subsequently, the circuit of the magnet 159 will be broken, allowing the return of the depressed interposer to normal position.

Upon energization of the punch magnet 159 in this manner, the armature 160 will be swung about its pivot and through the link 161 will rock a bell crank 162 about a pivot to draw the link 163 downward and rock the plate or depressor 151.

Subsequently, the circuit of the magnet 159 will be broken allowing the return of the depressed interposer to normal position. At this time the escapement mechanism will be effective and the rack and card carriage will advance one tooth to permit punching in the next column of the card.

Across the lower edge of all of the interposers 7 is a bail or universal member 164 pivoted at 168 and reaching into notches in the interposers. Attached to the bail member 164 is a depending arm 169 held against a finger on link 161 by a spring 170. This spring also tends to pull the arm 169 downwardly rocking the bail 164 clockwise into engagement with the right hand shoulder of the slots in the interposers 7. The arm 169 has a shoulder normally hooked under the lower contact leaf of the pair of contacts 158. When an interposer 7 is advanced to operative position, this interposer rocks the bail 164 counterclockwise raising the arm 169 and causing contacts 158 to be closed. This causes energization of magnet 159 to operate the perforating device. As the punch passes through the card and the link 161 moves to the right, the finger extending upwardly therefrom will push the lower end of arm 169 to the right so that the contact leaf will be released and contacts 158 will then open, deenergizing the magnet 159 and permitting the punch and its actuating mechanism to return to normal positions.

The interposer 7 returns when the actuating magnet 154 is released and permits bail 164 to turn clockwise to normal position and arm 169 to be lowered so that its shoulder will again snap under the lower blade of contacts 158 and be ready to close the contacts when the next interposer is advanced. It will be recognized that, when the contact leaf is released, contacts 158 cannot be closed again until the magnet which effected their closing has been deenergized and the next energization effected.

One of the interposers 7 does not have its left hand end in line with plate 151 notched and is also not actuated by any magnet. This is the well known spacing interposer operable whenever the card is to be "spaced" without accompanying punching thereof. As will be explained from the circuit diagram hereinafter, the magnet 159 may be energized independently of closure of contacts 158 so that through this "spacing" interposer the escapement alone will be operated to space the card.

Escapement mechanism

When the card C is in position above the punches 5 (Fig. 14), further advance is controlled by the escapement mechanism which in turn is responsive to the depression of the interposers 7. Each interposer rests upon a bail 40 operatively connected to rock a shaft 43 counterclockwise in Fig. 14 and clockwise in Fig. 19. The rod 43 is rocked as an incident to each spacing or punching operation and has secured to one end thereof oppositely extending arms 45, 46 (see Fig. 19), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked, arm 46 will, through its pin and slot connection with dog 47, lift the latter out of one of the notches of the rack 15 and at the same time arm 45 will depress locking dog 48 into a notch between the rack teeth. At this time a spring 49 advances the loosely pivoted dog 47 a short distance, just sufficient to permit this dog to move above the top of the next tooth. When the locking dog is again raised, stepping dog 47, due to the movement of rack 15, will ride down along the next tooth until it strikes the end thereof and the carriage is thereby arrested. The usual spring drum (not shown) is provided to bias the rack 15 toward the right as viewed in Fig. 19. The detailed structure of this dog and rack arrangement is well known and need not be further described, and it is sufficient to note that for each operation of an interposer 7 the rack 15 is advanced one step or tooth, carrying with it the pusher 13 and forward guide 14, so that the card is likewise advanced one step, each step of advancement being coextensive with the columnar spacing of the columns of the card.

Skip bar

The machine is provided with the usual skip bar indicated at 50 (Figs. 19 and 20) which is removably attached to the escapement rack 15 at one side thereof and provided with suitable notches and cam surfaces, which cooperate with the usual skip lifter arm 51 which has a beveled end 52. The end of the lifter 51 lies under the dog 47 (see Fig. 19) so that, if lifter 51 is moved toward the left as viewed in Fig. 20 at any time that a high portion of the skip bar is in line therewith, the beveled end of the lifter will cooperate with the cam surface of the bar to raise the end of the lifter which, upon being so raised, elevates the dog 47 to release rack 15. The lifter arm 51 will drop into the next notch in bar 50 and dog 47 will interrupt further movement of the rack beyond such point. The function of this skip bar 50 is to skip over the columns or fields of the card C which are not to be punched.

The right end of the lifter 51 is connected to a slider 53 whose right hand end is provided with an opening into which the free end of a finger 54 extends. This finger is integral with armature 55 of skip magnet 56, the armature being pivoted at 57. With this arrangement, energization of skip magnet 56 will cause lateral shifting of skip lifter 51 with consequent skipping operation. Upon deenergization of magnet 56, the parts are returned to normal by a spring 58.

A further means by which the card may be advanced is controlled by a release magnet designated 60 (Figs. 13 and 21a) which, when energized, will rock its armature 61 about pivot 62 causing the free end of an integral finger 63 to depress a release key 64. The mechanism controlled by this key is well known in this type of machine and is briefly as follows.

The lower end of key 64 through the bell crank 65 will draw a member 66 toward the right as viewed in Fig. 21a. This member 66 is suitably mounted for such movement and at its left hand end is provided with a cam surface 67 which cooperates with the left edge of the supporting plate 68. The member 66 also extends beneath the skip lifter 51 in a position generally as indicated in Fig. 20, so that as the member 66 is moved toward the right, cam 67 cooperating with plate 68 will cause an upward tilting of the left end of the member which in turn will lift the arm 51 upward against the stepping dog 47, whereupon the rack will be freed to advance uninterruptedly toward the left. Frictional engagement of the parts will maintain the member 66 in its shifted position, so that the escapement of the rack when initiated by the magnet 60 will not be interrupted until the card has been fully advanced, that is, until the last card column is advanced to the punching position.

At this time a suitable projection carried by the rack will engage a depending extension of the left extremity of member 66 and will draw the member toward the left back to the position it occupies in Fig. 21a. Briefly summarizing, after the card has been initially advanced to present the first card column to the punches 5, its further advance is controlled for column-by-column movement through the punch magnet 159. Multiple column advancement is controlled through the skip magnet 56 in cooperation with the skip bar 50, and the complete release of the card from any position to its last column position is controlled by the release magnet 60.

Automatic card ejector

The machine is provided with mechanism for automatically removing completely punched cards and depositing the same in a receptacle provided for the purpose. This mechanism is more fully shown and described in Patent 1,916,965 issued July 4, 1933, to J. M. Cunningham. Briefly, a gripper 70 occupies the position shown in Fig. 15 with its jaws open in card receiving position during the period that the card is advanced by the escapement mechanism. The gripper is carried by the rod 71 to which is secured a gear 72 which through idlers 73 is connected to a slidable rack 74 which is normally biased toward the right by a spring 75.

A pivoted latching member 76 engages a latching shoulder at the left hand extremity of the gripper and thereby serves to hold the parts in the position shown in Fig. 15. When the latching member 76 is rocked counterclockwise about its pivot 77, the spring 75 will be free to drive the rack 74 toward the right and, through the gearing 73, 72, flip the gripper 70 in a counterclockwise direction. This flipping action is effected after the card has been advanced to its extreme left hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76, there is provided the usual eject magnet 79 which, when energized, will rock its armature 80 about pivot 81 and draw a link 82 toward the right. The left extremity of the link is provided with an extension 83 which, when the link is moved, will strike a depending arm of the latch member 76 and effect the rocking action thereof which results in the ejection of the card by the gripper. This ejecting operation will bring about the automatic feeding of another card from the magazine 10 to the row of punches. This operation is initiated by means of a pair of automatic start contacts designated 84 which are closed through a pivoted bell crank 85, a depending arm of which is engaged by an extension 86 in rack 74 when the rack has been released for movement toward the right.

In a manner to be explained in connection with the circuit diagram, the contacts 84 control the operation of the driving motor 22 (Fig. 14) which, as explained, will cause advance of a new card from the magazine 10 and also cause movement toward the right of card pusher 13 and forward guide 14. As the rack 16 is moved toward the left (Fig. 15), its left hand end will engage an adjustable extension 87 carried by the rack 74 which will positively restore the rack toward the left and through the gearing shown will return the gripper to the position it occupies in Fig. 15, the latch member 76 being spring-biased to engage and hold the gripper in such position until the newly advanced card has been advanced to its last column position, whereupon the ejection and initiation of a new card feeding operation will take place.

Master card sensing mechanism

Referring to Figs. 13 and 21, a master card designated M may be placed in the machine in parallel alignment with the advanced card C. This card M is held in position between a pusher 97 and a forward guide 98 which are carried by cross arms 99 and 100, respectively, which arms are extended from the escapement rack 15. The card M is manually placed in position and travels back and forth with the card carriage. The operation is such that the card is advanced step by step past a set of brushes 101 for each of the successively fed cards C, and as each of the columns of the cards C pass the row of punches 5, the corresponding columns of the card M concurrently pass the sensing brushes 101. There are provided the usual twelve brushes 101 for sensing the index point positions of the card columns. The brushes 101 are mounted on an insulating block 102 and are moved vertically into contact with the card through linkage generally designated 103 which is controlled by the master brush magnet 104. The cooperating contact roller 105 is supported in the gate 106 which is pivoted at 107 and which, when the master card M has been placed in position, is rocked downwardly into closed position, where it is held by a spring-pressed latch 108. The free end of the gate is provided with a plunger which effects closure of so-called door contacts 109. Pairs of contacts 313 and 318 (Fig. 21) are provided and so positioned that, when magnet 104 is energized, its armature causes contacts 313 to open and contacts 318 to close.

Referring to Figs. 13 and 16, there is mounted on the cross arm 99 a finger piece 110 pivoted at 111, which finger piece also has a depending arm 112. When it is desired to manually back-space the cards, it is done by pressing against the finger piece 110, whereupon a slight rocking thereof is effected before the card carriage actually moves. During this slight rocking, the extension 112 will rock a universal bar 113 about its pivot 114 to cause a depending arm 115 thereon to open the so-called cut-out contacts 116. These contacts are in the master reading brush magnet circuits and are provided to insure that this magnet is de-energized and its related brushes in down position before there is any backward movement of the cards which might injure the inclined brushes 101.

Alphabetic keyboard

In Figs. 13 and 18 is shown the arrangement of the alphabetic-numeric keys. This section is an independent unit located as shown in Fig. 13 for convenient manipulation by the operator. The keys are marked with numerals and letters in accordance with standard keyboard arrangement, and each of the keys is arranged to close one or a pair of contacts in accordance with the coding assigned to the respective keys. These keys are designated 131 and are pivoted at 132 and the key, when depressed, will rock a lever 134 through a link 133 to cause closure of pairs of contacts 135. Underlying all the keys 131 is a bail 136 pivoted at 137 and provided with an upwardly extending arm 138 which causes closure of a pair of contacts 139, so that operation of any key 131, in addition to closing its contacts 135, also closes contacts 139, the parts being so adjusted that the contacts 135 are closed before contacts 139 are closed and open after contacts 139 again break. The keyboard is also provided with two additional keys 131 (Skip) and 131 (Release) identified as the skip and release keys respectively. These keys, when operated, close contacts similar to contacts 135 and are designated on the circuit diagram (Fig. 24) as contacts 135S and 135R. The space bar 140 is secured to an arm pivoted at 141 which, through link connection 142 provided with extension 143, is arranged to close two pairs of contacts 144 and 144a.

Beneath bail 136 is a keyboard locking magnet 145 and an armature 145a arranged so that, when magnet 145 is energized, its armature is rocked into the path of bail 136 to prevent the rocking of the latter and consequently the keys 131 are also locked against operation.

Numerical keyboard

In Figs. 13 and 17 is illustrated the numerical keyboard in which a key 117 is provided for each of the twelve index point positions of the card in addition to a release key 117 (Release), a space key 117 (Skip), and an error key 117 (Error). Depression of any key 117, 117 (Release) or 117 (Skip) will rock a bell crank 119 which through a pin and slot connection will move a slider 120 toward the left as viewed in Fig. 17. Each of the sliders cooperates at its left end with a bail 121 to rock the same counterclockwise, and the bail in turn will rock a lever 122 to close a pair of contacts 123. Contacts 123 are common to all of the keys 117, 117 (Release) and 117 (Skip) and are closed upon depression of any one of said keys. Individual contacts 124, of which there is one pair for each such key 117, are also closed by depression of a key.

There is one slider 120 for each of the keys 117, 117 (Release) and 117 (Skip), which slider is urged to the left upon depression of its associated key, and for each slider there is also a lever 125 which is rocked to close the associated pair of contacts 124. For key 117 (Error) there is a separate bell crank 126 (Fig. 17), to which is connected a link 127 pivoted to a curved lever 128 which, when the key 117 (Error) is depressed, will be rocked clockwise to close a pair of contacts 129. These keys and their contacts are mechanically independent of the remainder of the mechanism and may be located in relation to the remainder of the apparatus as shown in Fig. 13 for convenient right hand operation. A locking magnet 148 is provided which, when energized, will rock its armature 148a to engage the common lever 122 and prevent its rocking and thereby prevent operation of any of the keys.

Miscellaneous contacts

Several contacts in addition to those described are provided in the machine, and the operation of these will be pointed out before the entire operation of the apparatus is explained in connection with the circuit diagram.

In Fig. 19 is shown a pair of contacts 45 known as the "last column" contacts. These contacts are closed by an arm 146 secured to the escapement rack 15 and so located that, when the escapement rack is advanced to the position in which the last column of the card is presented to the punches, the extension 146 will be in engagement with and close contacts 145. In the same figure are shown contacts 149, whose upper blade is shifted by an arm 150 which is loosely pivoted on the rod 43 and which has a lateral extension resting upon the upper edge of the stepping dog 47 so that, during escapement from one column to another, the incidental raising of the stepping dog 47 will cause opening of contacts 149 through arm 150 during the period that the dog is raised. A second pair of contacts 149a is located directly behind contacts 149 and operated concurrently therewith by arm 150.

Storage mechanism

This mechanism is a separate mechanical unit whose only connection with the punching mechanism is through electrical connections to be traced in connection with the explanation of the wiring diagram.

Constantly running motor M1 (Figs. 1 and 2) through belt and pulley connection 200 drives a shaft 201 whose other end, through further belt and pulley connection 202, drives a wheel 203 (see also Fig. 9). Secured to this wheel is an internally toothed ratchet 204 which, as viewed in Fig. 2, rotates constantly in a counterclockwise direction. Lying in the plane of ratchet 204 is a clutch element 205 (see Fig. 3) mounted for sliding movement in a slot 206 formed in an enlarged head 207 of a shaft 208. A spring 209 expanding against a block 210 integral with head 207 normally urges the element 205 toward engagement with the teeth of ratchet 204. A lever 211 having a circular end recessed in head 207 extends through a slot 212 (Fig. 3) of element 205 and has its free end normally abutting an arm 213. The arm 213 is integral with armature 214 pivoted at 215 and normally held in the position shown in Fig. 2 by a spring 216.

When magnet 217 is energized, armature 214 is rocked about its pivot 215, rocking arm 213 out of engagement with lever 211. Thereupon, spring 209 is freed to slide element 205 into engagement with ratchet 204, resulting in rotation of head 207 and shaft 208. Near the end of a revolution of the shaft a cam 217 secured to head 207 engages a finger 218 integral with armature 214 causing the latter to positively restore arm 213 into the path of lever 211, so that at the end of the revolution element 205 is retracted and declutched from the constantly running ratchet 204.

The opposite end of shaft 208 carries a notched disk 219 (see Figs. 4 and 9) with which notch a spring-pressed stop 220 cooperates when the shaft is in uncoupled or home position and prevents retrograde rotation of the shaft. Thus, through the mechanism just described momentary energization of the magnet 217 will result in a revolution of shaft 208.

The disk 219 carries an eccentrically mounted pin 221 located in the plane of a notched wheel 222 with the pin normally occupying the relative position shown in Figs. 1 and 4. As the shaft 208 is rotated, pin 221 will enter a notch of wheel 221 to rotate the wheel one tooth or step in a clockwise direction as viewed in Fig. 4. This wheel is provided with thirty notches, so that one revolution of shaft 208 will advance wheel 222 one-thirtieth of a revolution.

The wheel 222 is integral with a drum 223 whose cylindrical body portion (Fig. 1) is of insulating material. End heads 224 of the drum carry ball bearings to support the drum for rotation on a shaft 225. Along the length of drum 223 there are spaced fifteen sets of so-called spiders, all of which are of like construction. Each spider comprises a metallic ring 226 with bent-up sides serrated to form opposed circles of blades 227 and 228 (see Figs. 1, 5, 10 and 11). The ring 226 is wrapped around the drum and a pair of coil springs 229 is then extended thereabout to hold the ring against the drum, while a pin 230 serves to lock the ring against relative rotary movement on the drum. Between adjacent spiders there is a ring 232 of insulating material to electrically insulate them from one another. A contact ring 231 is in engagement with each ring 226 and a wiper 233 contacts the same to pass current to the ring 226 and fingers 227 and 228.

The blades 227 and 228 are springy or resilient with the outer end of blade 227 bent to form a hook 227a in which the end of blade 228 is normally latched as shown in Fig. 11 for the right hand pair of blades. Through mechanism about to be described, the blades may be disengaged so that under their own resiliency they will open to take position as shown in Fig. 10. With the blades latched together, they may be said to be unset and, when they are open, they may be said to be set or to contain an entry.

*Data entering mechanism.*—As explained, the drum 223 is stepped clockwise as viewed in Fig. 5, so that the pairs of blades are successively presented to a horizontal position in alignment with the end of an armature 234 (see also Fig. 10). This armature is pivoted at 235 and urged clockwise as viewed in Fig. 10 by a spring 236. When magnet 237 is energized, the armature 234 is attracted against pole piece 238 with the result that its free end strikes against end 227a, moving the latter to disengage blade 228, whereupon the latter blade springs to a position perpendicular to the axis of drum 223.

There is a magnet 237 for each ring of blades 227, 228 arranged in two horizontal rows with their armatures lying in a single line. Each ring and related magnet 237 is allocated to a different digit and designation as follows: 9, 8, 7, 6, 5, 4, 3, 2, 1, 0, 11, 12, Release, Skip and Space, as identified in Fig. 1. When any row of blades is in line with the line of armatures, the pairs of blades may be selectively set by completion of circuits through the related magnets under control of keys as will be explained in connection with the circuit diagram. Such energization may be of a single magnet to set up any of the designations listed or in combinations to represent alphabetic characters in accordance with a coding arrangement.

The timing is such that magnets 237 are first selectively energized to effect a setting and thereafter the clutch magnet 217 is energized to advance the set column of blades and bring the next succeeding column into setting position. Just prior to such advance, the new column is reset, that is, any pair of blades in the new column that may already have a setting is relatched. The mechanism for doing this comprises a cam 239 (Figs. 2 and 9) secured on shaft 208 which engages a roller 240 and rocks a lever 241 pivoted at 242 against a spring 243. The upper end of lever 241 is bifurcated to receive the spherical end of a bellcrank 244 (Fig. 1) which is pivoted at 245. Between bellcranks 244 and an arm 246 pivoted at 247 is a link 248 having fingers 249 which, when link is shifted to the left in Fig. 1, will engage blades 228 to move such as are in set position back to latched or unset position.

As seen in Fig. 5, the row of fingers 249 is in line with the row of blades 227, 228 immediately following the row at the setting position, so that through the operation of cam 239 the blades are reset prior to their arrival in such setting position. Whenever any magnet 237 is energized, there is an accompanying energization of magnet 217 so that the drum is stepped around to receive settings in the successive rows.

Beneath link 248 (Figs. 1 and 4) and parallel thereto is a link 250 supported at opposite ends on arms 251 and 252. Arm 251 has an L-shaped bracket 254 riveted thereto, whose one side lies against bellcrank 244 and is resiliently held in such position by a spring 253. Thus, when link 248 is moved to the left, bellcrank 244 rocks away from bracket 254 and spring 253 moves link 250 a short distance in the same direction. This link has a row of downwardly extending pins 255 lying adjacent armatures 234 (see Figs. 5 and 10) and normally holding the armatures in restored position, so that when the link is moved these pins shift to the left as viewed in Fig. 10 to enable the armatures to operate and thereafter, when the link is returned, the pins serve to restore the armatures.

Referring to Fig. 2, the reset link operating cam 239 is shown as having a high portion, a low portion and an intermediate portion arranged so that, when the cam makes a revolution, the high portion first shifts link 248 (see Fig. 1) to its extreme left hand position, then to its extreme right hand position, and then to its intermediate position, which last is its normal rest position.

Referring to Fig. 1, when reset link 248 is in its intermediate or rest position, fingers 256 fastened to the right end thereof enable closure of pairs of contacts 258 and 259 and opening of a pair of contacts 257. When link 248 moves to the left under control of the high part of cam 239, contacts 257 close and contacts 259 open while contacts 258 remain closed. When link 248 thereafter moves to the right beyond the position shown in Fig. 1, under control of the low part of cam 239 contacts 258 open as well as contacts 257. When the link finally returns to its intermediate position, contacts 258 reclose. These contacts 258 are open while the drum is turning and serve to prevent magnets 234 from being energized during such period when no blades are in line with the armatures 234.

Figure 8:
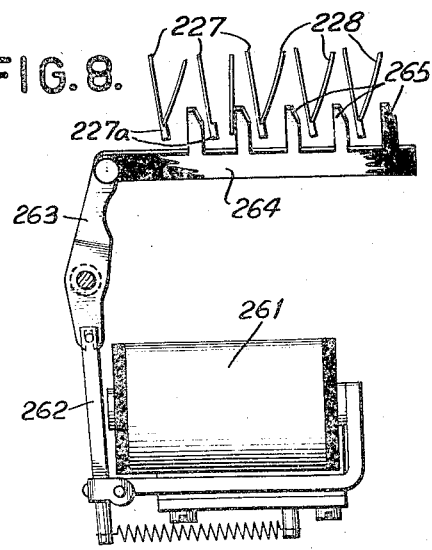
Fig. 8 is a detail of the error reset magnet and the mechanism operated thereby.

*Back space reset mechanism.*—After an entry has been made in a row of blades and such row has been advanced one step, the drum may be backspaced and such setting erased. This is effected by energizing a magnet 261 (Figs. 1, 4 and 8) which attracts its armature 262 to rock a lever 263 and draw link 264 to the left, whereby fingers 265 engage blades 228 that are set or open and restore them to unset or latched position. As seen in Figs. 4 and 5, this link 264 and its fingers 265 lie one step beyond or below the setting position.

Substantially concurrently with said resetting position, a solenoid 266 (Fig. 2) is energized and through pin and slot connection 267 its plunger rocks an arm 268 secured on a rod 269 (Figs. 1, 4 and 9) whose inner end carries an arm 270 which has a pin 271 in its free end. This pin 271 lies between pivoted pawls 272 and 273, which are urged toward one another by a spring 274 and normally held by pin 271 in the position shown in Fig. 4, with pawl 272 out of engagement and pawl 273 in engagement with the teeth of a ratchet 275 secured to notched wheel 222 which is integral with the blade drum 223. Spring means, yet to be described, bias the ratchet wheel and drum assembly in a clockwise direction, so that energization of solenoid 266 will rock rod 269 and pin 271 counterclockwise to disengage pawl 273 from and engage pawl 272 with ratchet 275, the ratchet thereby advancing part of a tooth space. Upon deenergization of the magnet, the pawls restore and ratchet 275 completes the step of movement to return the reset row of blades back to the setting position. Obviously, repeated operation of this back space mechanism will reset and back space the next row of blades and so on.

Power to effect the backspacing is derived from a tension spring 277 (Figs. 1 and 6) whose one end is anchored to the frame of the machine and whose other end is connected at 278 to a clamp 279 encircling a hub 280 to which is secured a spur gear 281 and a bevel gear 282. The hub and gears are freely rotatable on the shaft 225 and spring 277 tends to turn them counterclockwise as viewed in Fig. 6. Gear 281 meshes with a pinion 283 integral with another pinion 284 which in turn meshes with a gear 285 secured to the drum 223, so that the drum and its attached back space ratchet are also urged in the same direction.

Figure 6:
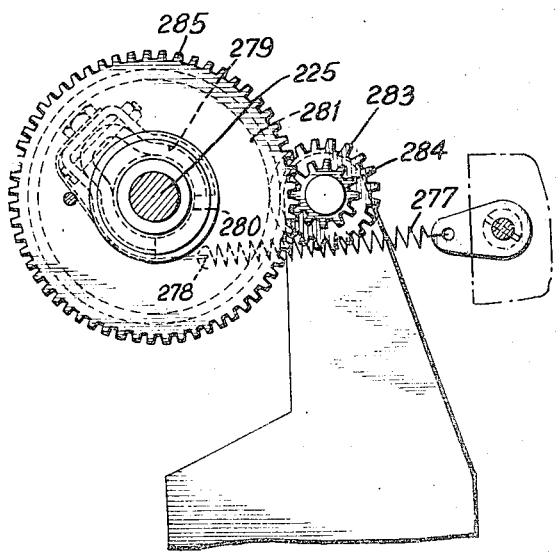
Fig. 6 is a detail section taken along the lines 6—6 of Fig. 1, showing the tensioning device for operating the back space mechanism.

The tension of the clamp 279 is so adjusted that as the drum advances in a setting direction, i. e., clockwise in Figs. 4 and 6, the clamp 279 moves therewith in the same direction and will slip when the tension of spring 277 becomes greater than the frictional force exerted by the clamp. This keeps spring 277 under tension so that, when a back space action is required, the spring 277 acting through the clamp will effect retrograde stepping of the drum as explained.

Figure 7:
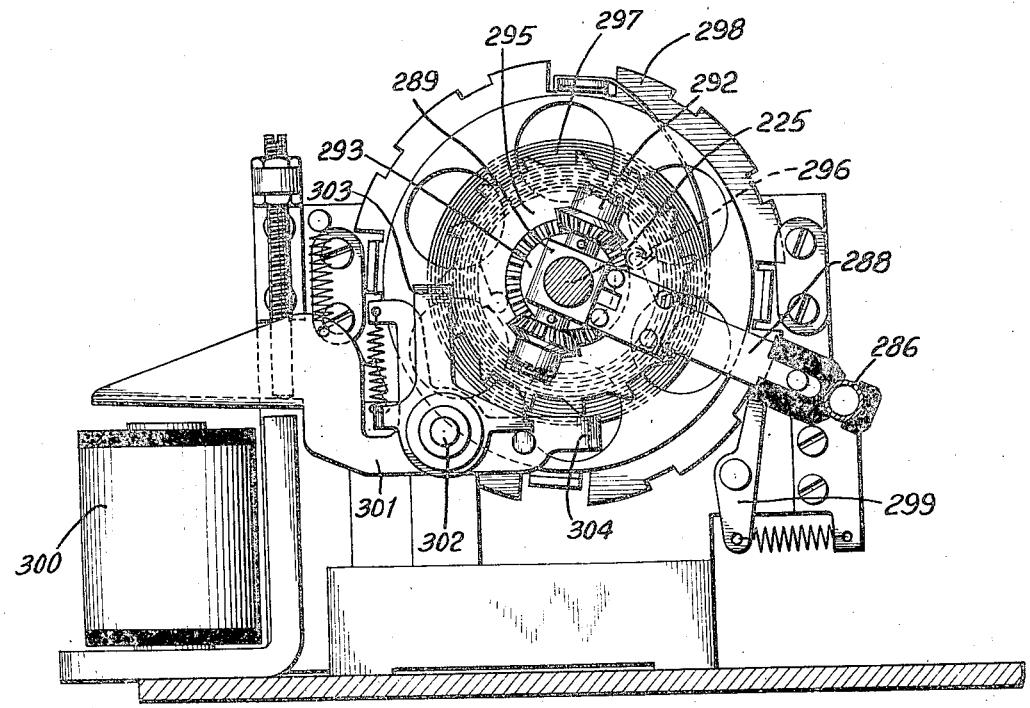
Fig. 7 is a section taken along the lines 7—7 of Fig. 1, showing the mechanism for controlling the readout device.

*The data readout mechanism.*—Extending parallel to drum 223 is a tubular rod 286 (Fig. 1) whose supporting arm 287 at one end is secured to shaft 225 and whose other supporting arm 288 is secured to a differential pinion supporting block 289 which is also secured to the shaft 225 (see Fig. 7). Spaced along the rod are so-called wipers 290 located in the path of blades 228 when the latter are in their open or set position. Each wiper comprises a pair of blades forming an angle through which blade 228 passes as indicated in Figs. 11 and 12.

Whenever the drum and blades 227, 228 are stepped ahead, the wipers 290 are advanced therewith through the same angular amount as follows: When drum 223 is advanced, the gear 285 (Fig. 1) drives gear 281 and bevel 282 through the pinions 283 and 284 which causes rotation of bevel pinions 292. The pinions roll upon a bevel gear 293 (Fig. 7) integral with a ratchet 295 which is restrained against rotation as will be explained. Since the bevel pinions 292 are supported on block 289, the shaft 225 is rotated clockwise as viewed in Fig. 7 together with the drum, the gear ratios being such that the shaft and drum in effect rotate as one.

The readout rod 286 may also be advanced in the opposite direction independently of the movement of drum 223 as follows: The ratchet 295 has connection 296 (Fig. 7) with the inner end of a coiled leaf spring 297 whose outer end is anchored to an adjustably settable disk 298 which is latched in position by a spring-pressed dog 299. When the readout escapement magnet 300 is energized, armature lever 301 will rock about its pivot 302 to cause pawls 303 and 304 to escape ratchet 295 one tooth. Bevel 293 accordingly turns pinions 292 which roll on the now stationary bevel 282 (Fig. 1) and arm 288 is accordingly advanced one step in a counterclockwise direction as viewed in Fig. 7.

Rod 286 (Fig. 5) is shown in full lines in its so-called home position from which it is stepped clockwise with drum 223 as entries are made in the successive rows of blades. When in such home position a cam 305 (Figs. 1 and 2) secured to shaft 225 holds a pair of contacts 306 open. The cam 305 is configured so that, after the rod 286 has been advanced one step from home position in a clockwise direction, contacts 306 close.

A similar cam 307 cooperates with a similar pair of contacts 308 (directly behind contacts 306) which close when the rod 286 has been advanced to its extreme or limit position shown in dotted lines in Fig. 5. These contacts 306 and 308 control interlocking circuits between the entering and reading-out mechanisms. Looking at Fig. 5, reading-in is represented by the clockwise stepping of drum 223 and reading-out is represented by the counterclockwise stepping of rod 286, and both operations are independent of one another, except at the limit positions of the readout arms, that is, rod 286 does not step any further in a counterclockwise direction than the home position, except for back space operations, and it does not advance any further with drum 223 than to its dotted limit position. With the rod 286 in such limit position, the drum is said to be full and no further entries can be made until the readout rod has stepped counterclockwise.

The sequence of operations generally is as follows: Data, either numerical, alphabetical or functional, is entered on successive rows of blades during which operations the readout rod 286 advances with the drum. At any time after rod 286 has left home position, the readout operation may begin, stepping rod 286 back toward home position while the entering continues and depending upon whether the readin is faster than the readout, rod 286 will be stepped further clockwise or counterclockwise.

Problem

A representative series of operations will now be explained in connection with Fig. 23 to point out generally what takes place to punch a succession of three cards, after which the circuit diagram will be explained to set forth the specific steps of operation involved to show how the various units of the apparatus are coordinated.

In Fig. 23, three C cards are shown designated as card I, card II and card III, above which is shown the master card M containing perforations which are to be reproduced in each of the record cards C. For purposes of explanation, the fields of the card are separately designated $a$, $b$—$g$, $h$. For card I, fields $a$, $d$ and $g$ are to be key punched, fields $b$ and $c$ are to be reproduced under control of the similarly designated fields in the master card M, field $f$ is to be skipped under control of the skip bar 50 which is configured with a high portion coextensive with the field $f$. Field $c$ is to be spaced without punching and field $h$ is also to be skipped.

Card II is to have field $d$ spaced without punching and is to receive punching in field $f$, while card III is to have the last three fields skipped.

At the bottom of Fig. 23 is a representation of the rows of contact blades of the storage mechanism with the column numbers 1 to 30 represented and the sections or groups of columns required for the setting of the data for the three cards indicated. An X made at the coordinate intersections indicate positions in which a contact blade setting has been made under key control. Thus, in the first column designated 1 the digit 1 is set up, in column 2 the digit 2, and so on to column 6. In column 7, the space contacts are set. In columns 8 and 9, the digit 7 is set, in column 10 the skip contacts are set, in columns 11 and 12 two digits are set, in column 13 the release contacts are set, and in column 14 the space contacts are set. In a similar fashion, the contacts representing data and machine functions for card II are likewise set up as indicated in columns 15 to 30.

After column 1 has been set, the storage mechanism may begin to read out the data set up for card I and control the punching machine. Thus, columns 1 to 6 will thereafter cause punching in field $a$ of card I, and after the sixth column has been punched, the card is escaped to the first column in field $b$, the master card sensing devices automatically take over and cause punching in field $b$ from the master card M. During this operation, the operator continues to effect entries in the storage unit in later columns but readout operations are suspended.

Upon completion of the punching of field $b$, the storage unit again takes over control, effects spacing across field $c$, then punching in field $d$, upon completion of which field $e$ receives punching under control of the master card and the readout of the storage mechanism is ineffective during this period, while the operator continues to make further entries therein. When the last column in field $e$ is punched, the card escapes to the first column in field $f$, control is returned to the readout device of the storage mechanism, and column 10 now causes the operation of the skip magnet which in cooperation with the high portion of the skip bar 50 will effect an automatic skipping of field $f$, bringing the first column of the field $g$ to punching position, which field is then controlled by the settings in columns 11 and 12.

Column 13 of the storage mechanism controls the releasing mechanism which causes card I to be advanced to the last column position. Thereafter, a space setting of column 14 causes card I to be advanced out of the machine and card II is brought into position with the first column thereof in punching position with accompanying return of the card M to its first column sensing position. Again, of course, the operator may continue to effect entries in other positions of the storage mechanism while the card feeding mechanism functions. With the new card II in the first column punching position, the readout device of the storage mechanism becomes operative and columns 15 to 20 control punching in field *a* of this card with other operations taking place in a manner similar to that explained for card I.

When this card arrives in the first column of field *g*, the twenty-ninth column of the storage mechanism again effects a releasing action to feed this card to its last column position, and then a space setting in column 30 feeds the card II out and advances new card III into position. In the meantime the storage drum has completed a revolution and, depending upon how far the operator is in advance of the readout mechanism, settings are being made in columns of the card which previously had been controlling operations for card I. This is indicated in the drawings by a repeated representation of the card columns after 30. Thus, for card III the data to be punched in field *a* is derived from columns 1 to 6 of the storage mechanism. For this card, release is effected when the first column of field *f* has been advanced to punching position.

Where card III, for example, represents the last card of a group to be punched, the operator after the setting of the last item or function to be performed on this card operates the space key several times to effect a succession of space settings in the storage mechanism. This has the effect of stepping the storage contact blades around into the range of the readout wipers which, as it will be recalled, are spaced five positions beyond the setting position. This repeated space setting is only required for the very last card.

In the diagram (Fig. 23), the cards are shown as punched with single holes in the columns and only a few columns are represented, but it will be understood that multiple perforations may be effected in any of the columns to represent coded alphabetic data and similarly the settings in the columns of the storage mechanism may be multiples likewise.

From the nature of the construction of the storage device, whereby the last readout position is five steps removed from the setting position, it will be apparent that after any punching operation there will remain five settings when all operations are completed. There may, of course, be more if the operator has inadvertently continued operating space or digit keys after the last card has been ejected so that, when the machine is again utilized with a fresh batch of blank cards placed in the magazine, certain preliminary settings are required.

Such remaining settings of some prior operation are shown at the left end of the storage device in Fig. 23, as five successive space settings in columns 24 to 28. The operator will first manually shift the card carriage (without a card therein) by means of finger piece 110 (Fig. 13) to any position higher than the fifth column in punching position and will then effect a release setting and a space setting in the next two columns 29 and 30 as a preliminary and may then proceed to set the following columns with the data for card I. The effect of this, as will be specifically explained in connection with the circuit diagram, will be to operate the punch magnet idly under control of the settings in columns 24 to 28, release the carriage to its last column position, and then effect an idle eject operation, during which the first card I is advanced from the supply magazine to its first column position in readiness to receive punching under control of column 1 of the storage device.

The circuit diagram

Referring now to Figs. 24, 24*a* and 24*b*, the manner in which the various units, hereinabove separately described, are coordinated to carry out the objects of the invention, will now be described with particular reference to the order in which events occur in the handling of the problem represented in Fig. 23.

In the circuit diagram, legends are applied to certain of the instrumentalities in order to better identify them with structure already described. A number of relays are included in the circuit diagram and such have been designated with the prefix R. The contacts opened or closed by these relays have been designated with the same reference character suffixed by a lower case letter. In order to simplify the arrangement of the wiring, the contacts in some cases are not shown adjacent to their controlling relays, and in such cases the relays have been shown in dotted outline adjacent the contacts which they control.

*Preliminary operations.*—As a preliminary, the master card M (Fig. 23) with perforations in fields *b* and *e* is placed in the card carriage as shown in Fig. 13. The skip bar 50 (Fig. 23) is attached to the rack in the usual fashion and is configured for skipping field *f* of the record cards. At the start, it is assumed that the card carriage is in its so-called last column position in which it is shown in Fig. 13, but no card C is located between the pusher 13 and the forward guide 14. At this starting point, the storage drum has several entries therein which resulted from the last previous operation of the machine. Specifically, the storage drum (if it be assumed that entries will occur in column numbers as represented at the bottom of Fig. 23) is in position with column 29 in readiness to receive an entry, and space entries are contained in columns 24 to 28, inclusive.

At this time also the readout rod 286 of the storage device is in its home position and the readout contacts 290 are in engagement with the blades of column 24. This relationship of parts is as shown in Fig. 5.

The operator will now push the card carriage rack 15 toward the right as viewed in Fig. 13 by pressing against the finger piece 110 to return the rack back at least five columns, and for the present explanation let us assume that the rack is pushed back eight columns. In other words, it is displaced eight spaces from its last column position but no card C is in position on the carriage. The main switch 310 (Fig. 24) is now closed to connect left side of line 311 to the negative source of current and line 312 to the positive source of current. With the switch 310 closed, the storage unit motor M1 (Fig. 24*a*) is placed in operation and will run continuously.

*Data entering operation.*—The operator first depresses the release key of either the typewriter or the numerical keyboard and follows this by depression of a space key. After these two keys have been depressed to set up columns 29 and 30 of the storage drum, the actual data to be entered in the first card is then set up by appropriate successive manipulation of the entering keys. These key settings thereafter may be made in uninterrupted succession.

Assuming that the release key of the numerical keyboard was depressed, the circuit controlled thereby is traceable as follows: line 311 (Fig. 24), wire 320, ball contacts 123, wire 314 (Fig. 24*a*), contacts 259, 258, wire 316 (Fig. 24), wire 321, release key contacts 124R, release magnet 237, wire 315 (Fig. 24a), relay contacts R55b to line 312. Energization of release magnet 237 will set the related blades 227 and 228 in column 29 of the storage drum. Concurrently with the completion of this circuit, a second circuit is traceable from line 311 (Fig. 24), wire 320, bail contacts 123, wire 314 (Fig. 24a), contacts 259, contacts 258, wire 322, storage drum stepping magnet 217, contacts R55b to line 312. This causes advance of the storage drum after column 29 has been set and results in the presentation of column 30 to the setting position after the cam operated reset bail 248 has cleared any setting that may have been contained therein.

As soon as the reset bail commences to move, the contacts 257 (Fig. 24a) close and contacts 259 open, so that a circuit is now traceable from line 311 (Fig. 24), wire 320, contacts 123, wire 314 (Fig. 24a), contacts 257, relay R55, line 312. Relay R55 opens its contacts R55b to break the circuits through the magnets 237 and 217 and closes its contacts R55a, which will provide a holding circuit that remains completed as long as the key remains depressed, to prevent any so-called repeat operation of the setting mechanism. This holding circuit is traceable from line 311 (Fig. 24), wire 320, contacts 123, wire 314 (Fig. 24a), contacts R55a, relay R55 to line 312. Upon release of the key and opening of contacts 123, the relay is, of course, deenergized and the circuits will be responsive to the next key operation.

If the key were released quickly after depression, the holding circuit for relay R55 might be broken before the drum had advanced to a new setting position. To prevent any key operation until the drum has advanced to its new position, the contacts 258 are provided and controlled, as explained in the mechanical description, to be opened during the interval that the drum is rotating to a new position. Since these contacts are in the setting magnet circuit as traced above, it will be apparent that no further setting can be made until these contacts reclose near the end of the cycle of operation of the drum advancing mechanism.

The movement of the drum following the setting by the release key will also carry the readout bar 286 in the same direction and, as explained, the home position contacts 306 (Fig. 24b) will close. These contacts will enable completion of readout circuits through column 24 of the drum to operate the devices in accordance with the contact setting in such column of the drum. The tracing of such readout circuits will be taken up under the heading "Data readout operations."

*Space key operation.*—Following the operation of the release key, the operator operates the space key. Assuming this to be the space key of the numerical keyboard, contacts 124S and bail contacts 123 (Fig. 24) are closed. As a result, circuits substantially as traced for the operation of the release key will be completed to energize the space setting magnet 237 and the storage drum stepping magnet 217, together with the incidental holding circuits. Following the space key operation, the first column of the drum is in readiness to receive the data for card I. The operator now in succession operates the 1, 2, 3, 4, 5 and 6 keys 117, each operation of which is accompanied by closure of the bail contacts 123 to again complete circuits as traced to energize the appropriate setting magnets 237 and the stepping magnet 217, so that the values indicated are set up in succession to represent the amount that is to be punched in field a in card I. When column 7 of the drum is in position, the space key is operated and thereafter the settings are made for columns 8 to 12.

When the drum has advanced to present its column 13, the release key is operated, followed by space key operation, and these two last settings indicate the termination of settings for the first card. The operator then proceeds without interruption to manipulate the keys in accordance with the data to be indicated in card II, which as seen in Fig. 23 requires setting of the drum columns 15 to 28 followed by the successive release and space settings indicating the termination of settings for card II.

During the successive setting operations, the readout devices are functioning to punch and advance the record cards so that, after column 30 of the drum has been set up, the column 1 is available for a new setting operation.

Let it be assumed for the moment, however, that the setting operation has been at a very rapid rate and the reading out operations have been considerably slower. The readout arm may have advanced to its limit position, wherein contacts 308 (Fig. 24a) close and complete a circuit through the keyboard locking magnets 148 and 145 as well as a single lamp 323. Accordingly, further operation of the setting keys is prevented and a visual signal is given to apprise the operator that the setting operations are ahead of the reading-out operations. In such event, the operator will wait until light 323 becomes extinguished.

*Error key operation.*—If, during the setting operation, the operator recognizes after depressing a key that this was done in error, such error may be corrected by operating the error reset key 117 (Error) to close the contacts 129 (Fig. 24a), which will energize the error reset magnet 261 to effect resetting of the last set column of the drum and will also cause energization of back space magnet 266 to bring such reset column back to resetting position to receive the appropriate setting. Repeated operation of this key will, of course, reset and return further columns.

The foregoing settings have been explained in connection with operation of the numerical keyboard. The operation of the keys of the alphabetic keyboard will be substantially the same, except that for keys representing alphabetic characters parallel circuits are completed to energize pairs of magnets 237 in accordance with the usual coding arrangement shown in Fig. 22. In Fig. 24 the circuits may readily be traced from wire 316, through the contacts 135 to one or a pair of magnets 237, such circuits being parallel to the circuits already traced through the contacts 124.

Data readout operations

The operations now to be described are under control of the home position contacts 306 of the drum and become effective as soon as the drum has advanced far enough to enable these contacts to close, which will occur as soon as column 29 has been set, and contacts 306 will remain closed if the setting of subsequent columns is sufficiently rapid to keep ahead of the readout operations. If not, the contacts will reopen and will await further entries. At the commencement of the readout operations, the card carriage is several positions from its last column position and no card is in the carriage.

With the carriage in this position, the master card reading brush magnet 104 is energized through a circuit traceable from line 311 (Fig. 24b), latch contacts 35, wire 324, relay contacts R1a, brush magnet 104, door contacts 109, cutout contacts 116, to line 312. The energization of magnet 104 causes closure of its contacts 318 and opening of its contacts 313, in which position these contacts remain until the card reaches its last column position.

*Space readout circuits.*—With the contacts 318 and 306 closed, a circuit is traceable from line 311 (Fig. 24b), contacts 35, contacts 318, contacts 149, relay contacts R51a, readout escapement magnet 300, to line 312. Energization of magnet 300 conditions the readout escapement mechanism to advance the readout bar 286 when the circuit traced is broken. At the same time a parallel circuit is completed from line 311, contacts 35, contacts 318, contacts 149a, wire 325, relay contacts R56a, home position contacts 306, wire 319 (Fig. 24a), the readout bar 286, wiper blades 290 in line with the space contacts 228 of column 29, the space relay R52, to line 312.

Magnet R52 closes its contacts R52b (Fig. 24b) which completes a parallel circuit traceable from line 311 (Fig. 24b), contacts 35, 318, 149a, R56a, 306, wire 319 (Fig. 24a), bar 286, uppermost wiper 290, wire 326 (Fig. 24b), contacts R52b, wire 327, punch magnet 159, to line 312. As explained in the mechanical description, the operation of the punch magnet 159 will effect escapement of the card carriage, and during such escapement operation the floating cam contacts 149, 149a open. Such opening will deenergize the readout escapement magnet 300, so that the readout bar 286 will escape to column 25 in which the circuits just traced will be repeated to advance the carriage another step, and so on until the space setting in column 28 (see Fig. 23) has been sensed and the readout blades advanced to sense the release setting in column 29.

*Release readout circuits.*—The release circuit is traceable from line 311 (Fig. 24b), contacts 35, 318, 149a, wire 325, contacts R56a, 306, wire 319 (Fig. 24a), readout bar 286, blade 290 in the release position, release relay R54, to line 312. Relay R54 closes its contacts R54a (Fig. 24b) to complete the circuit through the release magnet 60. It also closes a pair of contacts R54b which complete a circuit to the punch magnet 159 for the purpose of aiding the release magnet in operating the escapement mechanism. Energization of the release magnet 60, as explained in the mechanical description, will release the card carriage from whatever position it may be in at the time and advance it to its last column position.

When the card arrives in the last column position, the contacts 145 close and complete a circuit to energize relay R1 which opens its contacts R1a and closes its contacts R1b, the latter closing before the former open. Consequently, brush magnet 104 remains energized through a circuit from line 311, contacts 35, 318, 149a, switch SW2, contacts R1b, magnet 104, contacts 109 and 116 to line 312. As a result, with the carriage in last column position, brush magnet contacts 313 are open and the eject magnet will not be energized until contacts 149a again open. The space magnet circuit is now automatically completed to energize relay R52, so that the punch magnet 159 is energized, and opens contacts 149 and 149a.

With the relay contacts R52a closed and the carriage in its last column position, a circuit is completed from line 311 (Fig. 24b), last column contacts 145, contacts R52a and eject magnet 79, to line 312. The eject jaws are accordingly flipped idly without a card, and at such time the automatic start contacts 84 are closed to complete a circuit from line 311, contacts 145, contacts 84, trip magnet 32, brush magnet contacts 313 (closed due to deenergization of brush magnet 104), to line 312. The energization of the space relay R52 has also through its contacts R52b energized the punch magnet 159 as already traced to open the floating cam contacts and allow the readout wipers to advance to read column 1 of the drum. No circuits through this column, however, can be completed since the brush magnet contacts 318 are now open and further readout operations will await reclosure of these contacts and also contacts 35, which also now open.

Energization of trip magnet 32 has shifted the latch contacts to close contacts 36 and open contacts 35. The former will complete the circuit through motor 22, which now functions to advance card I from the hopper into position to receive punching in its first column and at the same time returns the card carriage to receive card I. During such return the last column contacts 145 reopen to deenergize relay R1. When the feeding mechanism has completed its operation, the latch contacts resume their initial position with contacts 35 closed, so that the brush magnet 104 is again energized and its contacts 318 are closed. The machine is now ready to start actual punching operations in card I.

In succession, the settings in columns 1 to 6 inclusive of the drum will operate the proper selecting magnets 154 (Fig. 24) to punch the data represented in field a of card I. A representative circuit, for example that completed when the readout wipers are positioned at column 1 of the drum, is traceable from line 318 (Fig. 24b), contacts 35, 318, 149a, wire 325, contacts R56a, 306, wire 319, the bail 286, wiper 290 in the 1 position, the contacting blade 228, to the 1 magnet 154, and thence to line 312. Concurrently, there is energization of the readout escapement magnet 300. Energization of magnet 154 will advance the related interposer which causes mechanical closure of the interposer contacts 158, through which the punch magnet 159 is energized through a circuit traceable from line 311, contacts 35, wire 324, contacts 158, punch magnet 159, to line 312. This results in perforating the 1 position of the appropriate card column and also opening of the floating cam contacts 149, 149a to allow the wiper blades to escape to column 2 of the drum.

Incidental to the punching operation, the card carriage escapes to present the next column to the row of punches and the punching operation is repeated in accordance with the setting in column 2 of the drum. These punching operations are repeated for succeeding columns.

After the sixth column of the card escapes from punching position to present the next column which (see Fig. 23) is to be punched under control of the master card M, there is a shift in control effected to prevent completion of circuits under control of column 7 of the drum. This switching is effected by means of a high speed electronic relay arrangement, which causes energization of relay R56 to open the contacts R56a before the floating cam contacts 149a have closed during the shifting of the card from the last column of field a to the first column of field b. During such shifting, the master card which is moved concurrently with the card I brings its first punched column into engagement with the master card sensing brushes 101. As brushes 101 encounter the first perforated position or column of the card M (which will take place before the floating cam contacts reclose), positive voltage from line 312 is applied to the starter and main plates of a tube 328 of the type known as OA4G, traceable from line 312 (Fig. 24a), the punch selecting magnet 154 in the 1 position, the 1 brush 101, hole in the card in the 1 position (for the example shown in Fig. 23), contact roller 105, wire 329 (Fig. 24b) to tube 328.

The tube ionizes, thus impressing a positive voltage pulse on the grids of tubes 330 and 331 which are of the type known as 25L6, which then become conductive and energize relays R51 and R56 in their respective plate circuits. Energization of relay R56 causes its contacts R56a to open and contacts R56b to close, and relay R51 opens its contacts R51a to disconnect the readout escapement magnet 300.

The floating cam contacts 149 and 149a close an instant later, putting negative voltage on the plates of the tube 328 which then stops conducting, the connection to the negative side being traceable as follows: negative side of line 311, contacts 35, 318, 149a, wire 325, relay contacts R56b (now closed), wire 329, to the plates of the tube 328. However, as negative voltage is applied to the plates of the tube 328, stopping it from conducting, the tubes 330 and 331 do not stop conducting due to the charge in the condenser-resistor connection 332 connected between the cathodes of the tube 328 and the tubes 330 and 331.

This condenser-resistor network acts to keep the grids of the tubes 330 and 331 positive during the interval of time that the floating cam contacts 149a are closed and the brushes 101 are in a perforation, leaving the same, and about to enter a succeeding perforation. As a result, the relays R51 and R56 remain energized as long as successive columns in the master card M are perforated. As soon as a column not perforated arrives in the sensing position, the tube 328 will fail to receive a positive charge, so that the relays R51 and R56 become deenergized with the contacts of relay R56 returning to the position shown in Fig. 24b.

A representative duplicating circuit is traceable from line 311 (Fig. 24b), contacts 35, 318, 149a, R56b, wire 329, common roller 105, perforation in the card M, brush 101, magnet 154, to line 312. The punching action will take place as described before for the energization of the magnet 154 accompanied by escapement of the card to the next columns to be punched and sensed.

During the period that master card M controls punching, the relay R51 is energized as explained and opens its contacts R15b (Fig. 24a), which contacts are located in the 12, 11 and 0 brush positions. Their function is to prevent back circuits through the common wiper blades 290 which may be standing at a drum column containing a combinational setting, when the master card is completing a circuit through a perforated column thereof. It may be pointed out at this time that, when a blade 228 is set in position 12, for example, the readout circuit is traceable in part from wire 319 (Fig. 24a), rod 286, wiper 290 in the 12th position, blade 228, contacts R51b, to the 12 magnet 154 and thence to line 312.

When punching has been controlled for the last column in field c of card M (Fig. 23), both cards escape to present field c of card C, and the machine will now automatically be controlled by the seventh column of the storage drum, which in this case is set for space operation.

Following this, columns 8 and 9 of the drum control punching in field d in card C and, as the card escapes from the last column of field d to the first column of field e, the sensing of a perforation in the first column of field e in the master card M will again operate the electronic relay system to energize relays R51 and R56 to automatically switch the control from the drum to the master card, and punching will ensue under control of the master card until ultimately the cards escape from the last column of field e to present the first column of field f to the row of punches. Column 10 of the drum is now active and in the example chosen is set for a skip operation in this column.

The circuit completed at this time is traceable from line 311 (Fig. 24b), contacts 35, 318, 149a, wire 325, contacts R56a, 306, wire 319, common 286, wiper 290, blade 228 in the skip position, skip relay R53, to line 312. Relay R53 closes its contacts R53b to energize the punch magnet 159 and open the floating cam contacts 149, so that the drum may escape. Contacts 149 also open to break a normally closed circuit through relay R7, traceable from line 311, contacts 35, 318, 149a, wire 333, and relay R7 to line 312. The contacts R53a complete a circuit through relay R3 which closes its contacts R3b completing a circuit to the skip magnet 56, traceable from line 311, contacts 35, wire 324, contacts R3b, magnet 56, to line 312. As a result, the skip lifter is operated to cooperate with the high portion of skip bar 50 (see Fig. 23) so that a carriage is automatically released for advance to the first column in field g. Energization of relay R3 will also close contacts R3a to set up a holding circuit from line 312, contacts R3a, R7a, wire 324, contacts 35, back to line 311. This holding circuit is broken when contacts 149a reclose to complete the circuit from line 311, contacts 35, 318, 149a, wire 332, 333, contacts R52c, relay R7, to line 312. This opens contacts R7a in the holding circuit of relay R3 so that the skip magnet 56 becomes deenergized at such time.

Thereafter, punching takes place under control of columns 11 and 12 of the drum, and then a release setting is read in column 13 which will cause the card to advance uninterruptedly to its last column position. While it does so, the drum escapes to column 14 where a space setting causes energization of the space relay R52 as already traced, which in turn results in the operation of the eject magnet 79 when the card arrives in last column position to eject this card. As an incident to the ejection, the auto start contacts 84 close to energize the trip magnet 32 which closes its contacts 32a to energize the motor 22, resulting in the feeding of a new card II to the punching position. Readout operations are, of course, suspended during these feeding operations and resumed when the new card is in punching position. Thereafter, operations take place under control of the settings made for card II in substantially the same manner as explained for card I.

Referring to Fig. 23, the skip bar is not utilized for this card, since no skip setting is made on the drum and, instead, punch settings are effected so that punching of data will take place in field e where for card I this field was skipped. Again, when the first column of field g is in punching position, at which time a column 29 of the drum is closed, a release setting followed by the space setting in column 30 will cause this card to be advanced to its last column position, ejected, and a new card III advanced from the supply magazine. With this last card, punch settings will be made for fields a, c and e and, when the first column of field f arrives at punching position, column 10 of the drum is in sensing position and a release setting followed by a space setting will cause this card to be ejected and a new card brought into position.

As explained in connection with the mechanical construction, the readout position is five spaces removed from the reading position, so that a value set on the drum will not be read out for at least five spaces after it has been entered. Accordingly, it is necessary for the very last card of any succession of cards fed through the machine to provide for advancing the last significant setting through the readout position. This is done by a series of repeated space settings as indicated at the right in Fig. 23. If no further settings are made beyond those shown in the diagram, the machine will stop after column 16 has received a space setting. This then requires that, when the machine is again utilized to punch cards, these extra space settings will be dissipated and this is done, as explained at the outset, by shifting the card carriage back from its last column position so that the space settings will simply space the carriage. These extra settings need not necessarily be space settings, but they may be digital or alphabetic data, inasmuch as when they control circuits during the beginning of a new group of cards the mechanism operated thereby will be ineffective, since no card is in the carriage for the first few operations.

From the foregoing, it is apparent that there is thus provided a machine in which the operator in uninterrupted succession will set up data to be punched in a series of cards where the data for each card may be variable without regard to any common data that is to be entered into the cards from a master or pattern card and without any regard to the time required for skipping or ejecting or feeding of successive cards.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a punching machine having a row of punches, escapement mechanism for advancing a card carriage past said row of punches, a pattern card having columns of perforations to be duplicated supported by said carriage, a row of sensing elements past which the pattern card moves as the carriage escapes, and operating means for said punches, in combination with a settable device having columns of settable elements corresponding to columns of a card to be punched, means for setting data in the successive columns of said settable elements, means for sensing the settable elements column by column, means controlled thereby and operative for each column of settable elements sensed for operating said punches and effecting a columnar escapement of the carriage, means controlled by the pattern card sensing elements when an escapement results in presentation of a perforation in the pattern card to said sensing elements for preventing control of the punches by the next column of settable elements, and further means controlled by the pattern card sensing elements for operating the punches according to the perforation sensed in the pattern card.

2. In a machine of the class described, punches, operating means therefor, a pair of devices each having columns of data representing positions thereon in which data may be entered, sensing means for each device, means for each device for causing its related sensing means to sense the related columns in succession, said last named means operating concurrently to effect sensing of data columns in both devices concurrently, each of said sensing means causing operation of said punch operating means upon sensing data, and means controlled by the sensing means of one of said devices upon sensing a column containing data for interrupting the sensing operation of the other devices and for maintaining interruption of said sensing as long as the said one sensing means senses data in successive columns of its related device.

3. In a card punching machine having mechanism for feeding a card step by step past a row of punches, and operating means for the punches, each punch operation causing a stepping of the card, in combination with a storage mechanism settable to represent data to be punched, a pattern card perforated to represent data to be punched, means controlled by the storage mechanism for controling the operating means of the punches to punch data in successive card columns, means controlled by the pattern card when a predetermined card column is in punching position for interrupting control by said storage mechanism and initiating control of punching by the pattern card, and means for maintaining control by the pattern card as long as said pattern card contains an uninterrupted succession of perforated columns, interruption of said succession causing resumption of control by the storage mechanism.

4. In a card punching machine, a pattern card having columns of data receiving positions in selected columns of which data entries are made, a storage mechanism having columns of data receiving positions wherein data entries are made in a continuous succession of columns, means for sensing the pattern card columns in succession, means for sensing the storage mechanism columns in succession, a column in one being sensed concurrently with a column in the other, record card punching devices controlled by both sensing means, the sensing means of the storage mechanism controlling said punching devices when the pattern card column concurrently sensed contains no data entry, and means operative when a pair of columns sensed both contain entries for interrupting sensing of the storage mechanism and enabling control of the punching devices solely by the pattern card sensing means.

5. The invention set forth in claim 4 in which the last named means comprises an electronic relay device responsive to the sensing of data in the pattern card columns.

6. In a card punching machine, a punch operating magnet, a perforated pattern card, a circuit connection arranged to be completed through a perforation in said card to energize said magnet, a settable contact device, a second circuit connection arranged to be completed through said contact device to energize said magnet, a switch common to both said circuit connections to render either effective, and means controlled by a part of the pattern card circuit connection for controlling the operation of said switch.

7. In a card punching machine, a punch operating magnet, a pattern card having data recorded therein, sensing means therefor, a storage device having data set therein, sensing means therefor, a circuit connection between the pattern card sensing means and said magnet, a second circuit connection between the storage device sensing means and said magnet, normally effective means for sending an electrical impulse through said second circuit connection to energize the magnet in accordance with the data in the storage device, a relay, means controlled thereby for preventing said impulse sending means from sending an impulse through the said second circuit connection and for causing it to send an impulse through the first named circuit connection to energize the magnet in accordance with data in the pattern card, and means including said first named circuit connection for operating said relay immediately upon the sensing of data in the pattern card.

8. In a machine of the class described, a set of data recording devices, a first data containing device, a second data containing device, means for repeatedly sensing said first data containing device, and controlling said recording devices in accordance with the data sensed, means for repeatedly sensing said second data containing device, each sensing being concurrent with a sensing by the first named sensing means, and means controlled by the second sensing means when data is sensed thereby for causing the second sensing means to control the recording devices in accordance with the data sensed in the second data containing device and for preventing control of the recording devices by the first data containing device.

9. The invention set forth in claim 8 in which the means controlled by the second sensing means is arranged to continuously prevent control of the recording devices by the first data containing device as long as the second sensing means senses data in the first data containing device.

10. In a card punching machine, a set of punches, actuating means therefor, means for feeding a record card past said punches column by column, a data receiving device having columns of data receiving positions, reading and readout mechanism therefor, a set of keys, repeated operation of said keys causing said reading mechanism to enter data in columns of the device in succession, said readout mechanism being controlled by the receiving device to operate the punch actuating means under control of the data entered column by column, means controlled by the data receiving device after a predetermined number of entries have been made for rendering said readout means effective and means controlled by the data receiving device when a predetermined number of entries are contained in the device that have not been read out for preventing further entries.

11. In a card punching machine, a set of punches, actuating means therefor, means for feeding a record card past said punches column by column, means for ejecting said card, means for entering a card into said feeding means, a data receiving device having columns of data receiving positions, reading and readout mechanism therefor, a set of keys, repeated operation of said keys causing said reading mechanism to enter data representative of punching, feeding or ejecting operations in columns of the device in succession, said readout mechanism being controlled by the receiving device to operate the punch actuating means, the feeding and ejecting means to perform the represented functions in accordance with the order of their entry, and means controlled by the data receiving device after a predetermined number of entries have been made for rendering the readout means effective.

12. In a machine of the class described, a storage drum having columns of entry receiving positions spaced around the drum, reading devices, keys for controlling the same, stepping mechanism for the drum, each key operation being effective to cause the reading device to effect a setting representative of a selected machine operation in a column of the drum and to cause the stepping mechanism to thereafter advance the drum to render the next column responsive to the reading device, a readout device controlled by the columns of entry receiving positions in succession, a plurality of machine function controlling devices selectively controlled by the readout device, and means controlled by each controlling device upon operation thereof for causing the readout device to cooperate with the next successive column of entry receiving positions.

13. The invention set forth in claim 12 in which the rates of advance of the reading and readout devices are different and in which means is provided to prevent operation of the readout device until at least a predetermined number of columns of the drum contain entries not read out, and means for preventing further operation of the reading device when a predetermined greater number of columns of the drum contain entries not read out.

14. In a key controlled punching machine, a resilient contact blade having a free and a latched position, a member normally holding the blade in its latched position, key controlled means for acting upon said member to cause it to release said blade whereby the resiliency of the blade will move it to its free position to represent an entry of data, a readout blade movable in the plane of the contact blade in the latter's free position in order to contact the same, a punch magnet and a circuit connection for operating the same completed by engagement of said readout and contact blades.

15. The invention set forth in claim 14 in which a resetting arm is provided and operated to engage and move the contact blade from its free position to its latched position, said member engaging and holding it in such latched position wherein it is out of the plane of the readout blade.

16. A storage mechanism for a punching machine comprising a drum, a plurality of columns of contact blades arranged around the surface of the drum, the columns extending in the direction of the axis of the drum, with the blades of the several columns aligned to form rows arranged in circles about the drum, each contact blade having a set and an unset position, a resetting station, a setting station, stepping mechanism for rotating the drum intermittently to present the columns of blades to the setting station in succession, magnets at the setting station, one for each blade in a column, operable selectively to set one or more blades in the presented column, said resetting station being spaced from the setting station, means at said resetting station operative as an incident to a setting operation for resetting the blades of each column prior to its arrival at the setting station, a readout device cooperating with the set blades subsequent to their setting to complete electric circuits therethrough, keys for controlling said setting magnets in accordance with data to be punched, and punching magnets controlled by said circuit connections.

17. In a machine of the class described, a pair of resilient blades spaced apart with one end of each anchored to a common member, the free end of one blade being hook-shaped, means for deflecting the other blade about its anchorage toward the first blade, said deflection causing the free end of said other blade to snap under the hook of the first blade to be held thereby against its resiliency, and means for engaging the hook-shaped end of the first blade to force the same away from the other blade whereby said other blade will swing back to its initial position under its own resiliency.

REYNOLD B. JOHNSON.

CERTIFICATE OF CORRECTION.

Patent No. 2,343,414. March 7, 1944.

REYNOLD B. JOHNSON.

It is hereby certified that error appears in the printed specification of the above numbered patent requiring correction as follows: Page 1, second column, line 4, for "reading in" read --readingin--; page 13, first column, line 21, for "reading" read --readin--; page 14, first column, lines 62 and 65, and second column, lines 9, 11, 25, 28, 33, 42 and 48, for "reading" read --readin--; and that the said Letters Patent should be read with this correction therein that the same may conform to the record of the case in the Patent Office.

Signed and sealed this 6th day of June, A. D. 1944.

Leslie Frazer (Seal)                     Acting Commissioner of Patents.